United States Patent
Sen et al.

(10) Patent No.: US 12,235,727 B2
(45) Date of Patent: Feb. 25, 2025

(54) CLIENT DATA LAYOUT RETENTION ACROSS SERVER DISRUPTION

(71) Applicant: Dell Products L.P., Round Rock, TX (US)

(72) Inventors: Soumyadeep Sen, Summit, NJ (US); JeanPierre Bono, Westboro, MA (US); Sitaram Pawar, Shrewsbury, MA (US); Ahsan Rashid, Piscataway, NJ (US)

(73) Assignee: DELL PRODUCTS L.P., Round Rock, TX (US)

( * ) Notice: Subject to any disclaimer, the term of this patent is extended or adjusted under 35 U.S.C. 154(b) by 79 days.

(21) Appl. No.: 18/356,845

(22) Filed: Jul. 21, 2023

(65) Prior Publication Data

US 2025/0028602 A1   Jan. 23, 2025

(51) Int. Cl.
  *G06F 11/14*  (2006.01)
  *G06F 16/16*  (2019.01)
  *G06F 16/17*  (2019.01)

(52) U.S. Cl.
  CPC ........ *G06F 11/1435* (2013.01); *G06F 16/164* (2019.01); *G06F 16/1727* (2019.01); *G06F 16/1734* (2019.01)

(58) Field of Classification Search
  CPC ............. G06F 11/1435; G06F 11/1402; G06F 11/1056
  USPC .............................................. 714/15, 16, 21
  See application file for complete search history.

(56) References Cited

U.S. PATENT DOCUMENTS

| | | | | |
|---|---|---|---|---|
| 9,304,908 | B1 * | 4/2016 | Karamcheti | G06F 3/0679 |
| 9,460,177 | B1 * | 10/2016 | Pawar | G06F 16/1865 |
| 9,852,149 | B1 * | 12/2017 | Taylor | G06F 16/1844 |
| 11,068,299 | B1 * | 7/2021 | Armangau | G06F 3/0688 |
| 2013/0275656 | A1 * | 10/2013 | Talagala | G06F 12/0246 711/103 |
| 2017/0277713 | A1 * | 9/2017 | Strauss | G06F 16/183 |
| 2022/0206715 | A1 * | 6/2022 | Kim | G06F 3/0656 |
| 2024/0248802 | A1 * | 7/2024 | Yadav | G06F 11/1469 |

FOREIGN PATENT DOCUMENTS

| | | | | |
|---|---|---|---|---|
| CN | 107025291 A | * | 8/2017 | G06F 16/113 |
| EP | 2176756 B1 | * | 11/2011 | G06F 11/004 |

\* cited by examiner

*Primary Examiner* — Chae M Ko
(74) *Attorney, Agent, or Firm* — Amin, Turocy & Watson, LLP

(57) ABSTRACT

Client data layout retention across server disruption can be performed and managed. In response to a data layout request from a client device (CD), a server can communicate, to CD, metadata, comprising a mapping of a group of blocks, in a data store of the server, to which CD is able to write data to the file, a file offset associated with the file, and a filesystem block number (FSBN) associated with the file offset. CD can write data to the group of blocks. CD can communicate data layout commit request, comprising the metadata relating to data layout, including file offset and FSBN, to the server. If server disruption occurs prior to committing data layout, CD can communicate reclaim request, comprising the metadata, to server, and server can recreate the data layout and commit the data layout to the data store based on the metadata.

20 Claims, 10 Drawing Sheets

CLIENT DATA LAYOUT RETENTION ACROSS SERVER DISRUPTION

BACKGROUND

A device (e.g., communication device, node, or other type of device) can communicate with a server to write data to, and store data in, a server, read data from the server, or to otherwise interact with or perform operations in conjunction with the server. For instance, the device can write data to a file where the data can be stored in storage locations (e.g., blocks) in a data store of the server.

The above-described description is merely intended to provide a contextual overview regarding devices and servers, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise: in response to a request to obtain a data layout associated with a file from a client device, communicating, by a system comprising a processor, extent list information to the client device, wherein the extent list information can comprise a mapping of a group of blocks in a data store of a server to which the client device is able to write data associated with the file, a file offset associated with the file, and a filesystem block number associated with the file offset. The method also can include: subsequent to the client device writing the data to the group of blocks in the data store based on the extent list information, and in response to a disruption of service of the server that occurs before committing of the data layout to the data store or before communicating, to the client device, a notification of a successful committing of the data layout to the data store, recreating, by the system, the data layout based on metadata relating to the data layout and received from the client device, wherein the metadata can comprise the file offset and the filesystem block number, and wherein the metadata can be received from the client device after the disruption is resolved.

In certain embodiments, the disclosed subject matter can comprise a client device that can comprise a memory that can store computer executable components, and a processor that can execute computer executable components stored in the memory. The computer executable components can comprise a write component that can write respective items of data to respective storage locations in a data store of a server based on extent list data relating to a data layout and comprising a mapping of a group of storage locations in the data store of the server, respective file offsets associated with the file, and respective filesystem storage location numbers associated with the respective file offsets. The computer executable components also can comprise a write manager component that can communicate a reclaim request, comprising metadata relating to the data layout, to the server to facilitate recreation of the data layout in response to an interruption of service by the server that potentially disrupted or prevented a commit of the data layout to the data store of the server, wherein the metadata can comprise information relating to the data layout, the information comprising the respective file offsets and the respective filesystem storage location numbers.

In still other embodiments, the disclosed subject matter can comprise a non-transitory machine-readable medium, comprising executable instructions that, when executed by a processor, can facilitate performance of operations. The operations can comprise: in response to a request to obtain a data layout associated with a file from a device, communicating extent list data to the device, wherein the extent list data can comprise a mapping of a group of storage locations in a data store of a server to which the device is able to write data associated with the file, respective file offsets associated with the file, and respective filesystem storage location numbers associated with the respective file offsets. The operations also can comprise, based on the monitoring, determining the respective processing states of the respective service requests associated with the respective services. The operations further can comprise: after the device has written the data to the group of storage locations in the data store in accordance with the extent list data, and in response to a disruption of service of the server that occurs before committing of the data layout to the data store or before communicating, to the device, a notification of a successful committing of the data layout to the data store, recreating the data layout based on metadata relating to the data layout and received from the device, wherein the metadata can comprise the respective file offsets and the respective filesystem storage location numbers, and wherein the metadata is received from the device after the disruption is resolved.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
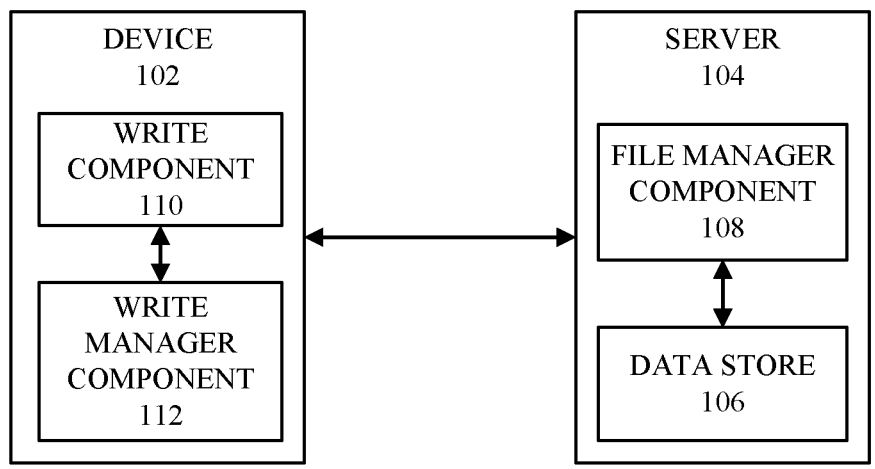
FIG. 1 illustrates a block diagram of a non-limiting example system that can desirably perform and manage client data layout retention across server disruption, in connection with commits of data layouts associated with files of client devices to a data store of the server, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to client device data layout retention across disruption of service of a server. In some parallel network file system (pNFS) architectures, with regard to the writing of data to storage locations in a data store of the server, a pNFS server typically may not persist data layout information in the filesystem of the server until the data layout is committed by the pNFS client device to the server. For instance, it can be desired to not store and persist data layout information in the filesystem until the client device requests that the data layout be committed to facilitate enhancing or optimizing the pNFS system for desirably high performance and speed. While this can be desirable for various reasons (e.g., to enhance or optimize the pNFS system for desirably high performance and speed), it also can be problematic in the event of disruption (e.g., interruption or crash) of operation of the server 104, as the data layout information (e.g., metadata relating to the data layout) can be lost, since the server 104 typically can maintain the data layout information in volatile memory. In that regard, it is noted that storing or caching metadata relating to a data layout persistently in the server can be inefficient, not feasible, or otherwise not desirable, given the scale of client devices and data layouts that can be associated with the server (e.g., hundreds or thousands of client devices, and hundreds or thousands of open data layouts per client, that can be associated with the server at a particular time). Without the metadata relating to the data layout, the storage locations where the data is written and stored in the data store of the server may not be known.

Also, to facilitate enhancing or optimizing the pNFS system to achieve desirably high performance and speed, the client device may not cache data after writing the data to the data store of the server, in accordance with the data layout, and the client device can be allowed to discard the data after writing it to the data store and before calling for a commit of the data layout to the data store, as, for example, data for a particular data layout may be written multiple times before doing a commit of the data layout, thus, the commit cost can be amortized. Another reason for the client device not caching the data after writing it to the data store of the server can be to enhance or optimize for random workload and memory semantic storage media. As a result, if the operation of the server is disrupted before the client device can have the data layout committed to the data store by the server, it can be desirable (e.g., wanted, needed, or suitable) for the server to guarantee that the data layout communicated to the client device prior to the server disruption is still valid.

However, existing techniques relating to data commits can be deficient as existing servers may not be able to guarantee that the data layout communicated to the client device prior to the server disruption is still valid and may not be able to perform a commit of a data layout, as requested by the client device, in the event of a server disruption.

It can be desirable for a server to be able to guarantee that a data layout communicated to a client device prior to a server disruption is still valid. It also can be desirable to be able to retain data layout information in the event of, and after, a disruption of operations of the server that may occur prior to successfully committing the data layout information to the server.

The disclosed subject matter can address and overcome the deficiencies of existing techniques with regard to data layouts associated with client devices, and can provide techniques that can desirably guarantee that a data layout communicated to a client device prior to a server disruption is still valid, and can retain data layout information associated with a client device in the event of, and after, a disruption of service of a server that may occur prior to successfully committing the data layout information to the server.

To that end, techniques for desirably (e.g., efficiently, suitably, enhancedly, or optimally) performing and managing client data layout retention across server disruption, in connection with commits of data layouts associated with files of client devices to a data store of the server, are presented. In some embodiments, a system can comprise a server that can be associated with (e.g., communicatively connected to) a client device. The server can maintain an in-memory state of a filesystem block mapping of a filesystem corresponding to file offsets associated with files and associated with a data store of the server. In response to a request for a data layout (also referred to as a file layout) received from the client device, the server can preallocate a group of storage locations (e.g., blocks) in the data store to make the group of storage locations available for writing data to the file, and can communicate metadata, comprising extent list data relating to the group of storage locations to the client device. The extent list data can comprise a list of extents and/or a mapping of the group of storage locations, in the data store of the server, to which the client device is able to write data to the file. The list of extents and/or the mapping can comprise metadata (e.g., extent and/or mapping information) such as, for example, device offsets associated with the group of storage locations of the data store that is part of the file layout, file offsets associated with the file, filesystem block numbers (FSBNs) associated with the file offsets, storage offsets associated with the group of storage locations, the lengths of the extents, the states of the extents, and/or other desired information.

In some embodiments, the client device, employing a write component, can write data directly to storage locations of the group of storage locations in the data store of the server out of band from the server, based at least in part on the metadata (e.g., the list of extents and/or the mapping), in accordance with the data layout. As a result of such writing, respective items of data can be persisted in respective storage locations of the group of storage locations of the data store. The client device can track the writing of the respective items of data to the respective storage locations of the group of storage locations. After writing the respective items of data to the respective storage locations of the group of storage locations of the data store, the client device (or associated user) can desire to commit the data layout to the data store. The client device can communicate a data layout commit request, comprising the metadata relating to the data layout, to the server to request that the data layout be committed to (e.g., committed to, and stored and persisted in) the data store, wherein the metadata can comprise the extent list data, mapping, device offsets, file offsets, FSBNs (which also can be referred to as filesystem storage location numbers), storage offsets, extent lengths, extent states, and/or other metadata relating to the data layout.

In some instances, after receiving the data layout commit request, and prior to performing the commit of the data layout, or prior to communicating a notification of a successful commit of the data layout to the client device, a disruption (e.g., crash) of service of the server may occur, and, as a result, the server may lose information, such as the metadata, relating to the data layout commit request. The client device can detect, or be made aware of, the disruption of the service of the server. Subsequent to the disruption of the service of the server being resolved, there can be a reclaim period during which clients devices, such as the client device, can submit reclaim requests to the server to request the server perform operations relating to lost requests, such as the data layout commit request, that the server may not have performed due to the disruption. For instance, the client device can communicate a reclaim request, comprising the metadata relating to the data layout, to the server, wherein the reclaim request can request that the data layout commit be performed, and wherein the metadata can comprise the extent list data, mapping, device offsets, file offsets, FSBNs, storage offsets, extent lengths, extent states, and/or other metadata relating to the data layout.

In response to the reclaim request, the server, employing a file manager component, can recreate the data layout based at least in part on the metadata relating to the data layout and received from the client device as part of or in connection with the reclaim request. For instance, the server can reconstruct a state of the metadata by performing exact block preference-based block allocation based at least in part on the metadata received from the client device, wherein the file manager component can allocate the group of blocks associated with the metadata based at least in part on the performing of the exact block preference-based block allocation. The file manager component can recreate the data layout based at least in part on the reconstructing of the state of the metadata. That is, based at least in part on the metadata received by the server from the client device as part of, or in connection with, the reclaim request, the file manager component can recreate the same data layout as the data layout that had been communicated to the server by the client device as part of the data layout commit request prior to the disruption of the service of the server.

If, based at least in part on the reconstructed state of the metadata, the file manager component determines that the data layout commit was not performed prior to the server disruption, due in part to there being no match of the file offsets and FSBNs associated with the reconstructed state of the metadata to metadata information stored in the data store, the file manager component can perform the data layout commit to commit the data layout (e.g., recreated data layout), including the associated metadata, to the data store. The file manager component can communicate a notification message (e.g., successful commit notification message) to the client device to notify the client device that the data layout has been successfully committed to the data store.

If, instead, based at least in part on the reconstructed state of the metadata, the file manager component determines that the data layout commit was not performed prior to the server disruption, due in part to the file offsets and FSBNs associated with the reconstructed state of the metadata being determined to match (e.g., satisfy a defined match criterion) file offsets and FSBNs already stored in the data store, the file manager component can determine that the committing of the data layout already was performed by the file manager component prior to the server disruption (e.g., however, the successful commit notification message had not been sent to the client device). In response to determining that the data layout already has been committed to the data store, the file manager component can discard or ignore the reclaim request. The file manager component also can communicate a notification message to the client device to notify the client device that the data layout has been successfully committed to the data store.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, suitably, enhancedly, or optimally) perform and manage client data layout retention across server disruption, in connection with commits of data layouts associated with files of client devices to a data store of the server, in accordance with various aspects and embodiments of the disclosed subject matter. The system 100 can comprise a device 102 (e.g., communication device, node, or node equipment or device). The device 102 also can be referred to as a client device. At desired times, the device 102 can be associated with (e.g., communicatively connected) a server 104 (e.g., server component, device, or equipment) to facilitate communication of data between the device 102 and the server 104, and/or storage of data in a data store 106 of or associated with the server 104. It is to be appreciated and understood that, while the system 100 depicts the device 102 and the server 104, in other embodiments, the system 100 can comprise more than one device and/or more than one server, wherein one or more devices, such as the device 102, can be associated with the server 104 or can be respectively associated respective servers, comprising the server 104. In certain embodiments, the server 104 can be part of a group of servers that can operate as a node network (e.g., a node network of server nodes) where a device (e.g., device 102) can connect to the node network, which can result in the device being connected to a server of the node network.

The device 102, can be a computer, a laptop computer, a server, a wireless, mobile, or smart phone, electronic pad or tablet, a virtual assistant (VA) device, electronic eyewear, electronic watch, or other electronic bodywear, an electronic gaming device, an Internet of Things (IoT) device (e.g., health monitoring device, toaster, coffee maker, blinds, music players, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device 102 can be associated with (e.g., communicatively connected to) the server 104 via a communication connection and channel, which can include a wireless or wireline communication connection and channel.

In certain embodiments, the device 102 and/or one or more other devices can be associated with (e.g., communicatively connected to) the server 104 and/or one or more other servers, and/or each other, via a communication network (not explicitly shown) via respective communication connections and channels, which can include wireless or wireline communication connections and channels. The communication network can comprise various network equipment (e.g., routers, gateways, transceivers, switches, base stations, access points, radio access networks (RANs), or other devices) that facilitate (e.g., enable) communication of information between respective items of network equipment of the communication network, communication of information between the one or more devices (e.g., device 102) and the communication network, and communication of information between the devices and the one or more servers (e.g., server 104) or between each other. The communication network can provide or facilitate wireless or wireline communication connections and channels between the one or more devices (e.g., device 102), and respectively associated services, and the communication network. For reasons of brevity or clarity, the various network equipment, components, functions, or devices of the communication network are not explicitly shown.

The server 104 can comprise a data store 106, which can comprise non-volatile and/or volatile memory that can be utilized to store data, such as described herein. The data store 106 can comprise storage locations (e.g., blocks) in which data can be stored. At various times, the device 102 can desire to write data, such as data of a file, to the data store 106 of the server 104. In some embodiments, the device 102 can write data directly to storage locations in the data store 106 of the server 104 out of band from the server 104, such as described herein. The device 102 can write data to the storage locations of the data store 106, in accordance a data layout that the device 102 can receive from the server 104. In certain embodiments, to facilitate the device 102 being able to directly write data to the data store 106 of the server 104 out of band from the server 104 (e.g., without involving the server (e.g., server processing resources) in the data write stack), the device 102 can be a pNFS device and the server 104 can be a pNFS server that can allow the device 102, and/or one or more other pNFS devices, to access the data store 106 of the server 104 directly and in parallel, in accordance with an NFS or pNFS protocol (e.g., NFS version 4.1 standard protocol or other suitable or compatible NFS protocol).

It can be desirable (e.g., wanted, needed, or otherwise desirable) to persist the written data and the data layout in the data store 106 (e.g., in non-volatile memory in the data store 106), as the data layout can indicate where the data is written in the data store 106. When the data is written to the storage locations in the data store 106 by the device 102, the data can be persisted in the data store 106. When the device 102 or associated user desires (e.g., wants) to persist the data layout in the data store, 106, the server 104 can perform a commit operation (e.g., at the request of the device 102) to commit and store the associated data layout in the data store 106 to persist the data layout in the data store 106.

As disclosed though, for a variety of reasons, it can be desired to not store and persist data layout information in the filesystem until the client device (or associated user) requests that the data layout be committed. While this can be desirable (e.g., to enhance or optimize certain systems, such as a pNFS system, for desirably high performance and speed), it also can be problematic in the event of disruption (e.g., interruption or crash) of operation of the server, as the data layout information can be lost, since the server can maintain the data layout information in volatile memory. If the operation of the server is disrupted before the data layout is committed to the data store by the server, it can be desirable (e.g., wanted, needed, or suitable) for the server to guarantee that the data layout communicated to the client device prior to the server disruption is still valid. Existing techniques relating to data commits can be deficient as existing servers may not be able to guarantee that the data layout communicated to the client device prior to the server disruption is still valid and may not be able to perform a commit of a data layout, as requested by the client device, in the event of a server disruption.

The disclosed subject matter, including the disclosed techniques, systems, methods, processes, servers, and devices (e.g., client devices) can address and overcome the deficiencies of existing techniques with regard to data layouts associated with client devices, can desirably guarantee that a data layout communicated to a client device prior to a server disruption is still valid, and can retain data layout information associated with a client device in the event of, and after, a disruption of service of a server that may occur prior to successfully committing the data layout information to the server.

To that end, techniques for desirably (e.g., efficiently, suitably, enhancedly, or optimally) performing and managing, commits of data layouts associated with files to the data store 106 of the server 104, including performing and managing client data layout retention across server disruption, in connection with commits of data layouts associated with files of client devices to the data store 106 of the server 104, are presented. The server 104 can maintain an in-memory state of a filesystem block mapping of a filesystem corresponding to file offsets associated with files and associated with the data store 106 of the server 104.

In accordance with various embodiments, the server 104 can comprise a file manager component 108 that can manage and perform various operations relating to data writes by devices (e.g., clients devices), such as the device 102, including providing data layouts (which also can be referred to as file layouts) to devices, preallocating storage locations of the data store 106 to the data layouts, performing commits of data layouts, performing and managing client data layout retention across disruption (e.g., interruption or crash) of operation or service of the server 104, and/or performing other desired operations relating to write operations and commits, such as described herein.

In some embodiments, in response to a request for a data layout received from the device 102, the file manager component 108 can preallocate a group of storage locations in the data store 106, and can communicate extent list data to the device 102. The extent list data can comprise a list of extents and/or a mapping of the group of storage locations in the data store 106 to which the device 102 is able to write data to the file. The list of extents and/or the mapping can comprise information (e.g., extent and/or mapping information) such as, for example, device offsets associated with the group of storage locations of the data store 106 that is part of the data layout, file offsets associated with the file, FSBNs (which also can be referred to as filesystem storage location numbers) associated with the file offsets, storage offsets associated with the data store 106, the lengths of the extents, the states of the extents, and/or other desired information. A device offset associated with an extent can identify or indicate a logical volume of the data store 106 on which an extent of the file is stored. A file offset associated with an extent can identify or indicate a starting byte offset in the file. An FSBN can be the starting FSBN for an associated file offset. An extent length associated with an extent can identify or indicate the size in bytes of the extent. A storage offset associated with an extent can identify or indicate a starting byte offset in the volume of the data store 106. An extent state associated with an extent can identify or indicate a state of the extent. Each extent can comprise or be associated with such other metadata (e.g., device offset, file offset, FSBN, storage offset, extent length of the extent, extent state, and/or other desired metadata).

The device 102, employing a write component 110, can write respective items of data of the file to respective storage locations of the group of storage locations of the data store 106, in accordance with the data layout, including the list of extents, the mapping, and/or the other metadata. At this point, the respective items of data can be persisted in the data store 106, although the data layout, which can indicate where the respective items of data are stored in the data store 106, is not yet persisted in the data store 106. The device 102 also can comprise a write manager component 112 that can manage and perform various operations relating to writing data to the data store 106, including tracking the writing of the respective items of data to the respective storage locations. After writing the respective items of data of the file to respective storage locations of the group of storage locations of the data store 106, the device 102 (or associated user) can desire to commit and store the data layout (e.g., the metadata relating to the data layout) associated with the file in the data store 106 because the data layout can indicate the respective storage locations where the respective items of data are stored in the data store 106.

The write manager component 112 can communicate a commit request, comprising the metadata relating to the data layout, to the server 104, wherein the commit request can request that the server 104 perform a commit operation to commit the data layout to the data store. The metadata can comprise, for example, the list of extents and/or the mapping can comprise information (e.g., extent and/or mapping information) such as, for example, device offsets associated with the storage locations of the group of storage locations of the data store 106 that is part of the data layout, file offsets associated with the file, FSBNs associated with the file offsets, storage offsets associated with the data store 106, the lengths of the extents, the states of the extents, and/or other desired information.

In some instances though, there may be a disruption (e.g., interruption or crash) of operation or service of the server 104 before the server 104 can perform the commit operation to commit the data layout to the data store 106. In such instances, due to the server disruption, the server 104 can lose the metadata relating to the data layout because the metadata is stored in volatile memory. In some other instances, the server 104 may commit the data layout prior to such server disruption occurring, however, the server disruption occurs before the server 104 can communicate a notification message to the device 102 to notify the device 102 that the data layout was successfully committed to the data store 106 of the server 104.

When a server disruption occurs, various requests, operations, and information (e.g., information, including metadata, stored in volatile memory) associated with the server 104 can be lost. To facilitate recovering from the server disruption, the server 104 can employ a reclaim period of a desired time duration where devices, such as the device 102, can submit reclaim requests to have the server 104 service requests, including data layout commit requests, and perform operations, such as data layout commit operations, that were or may have been lost due to the server disruption.

The devices, including the device 102, can detect, or can be made aware of, the disruption of the operation or service of the server 104, can detect, or can be made aware of, the resolving of the server disruption where the server 104 can be available to perform operations and provide services again, and/or can detect, or can be made aware of, the reclaim period during which reclaim requests can be submitted by the devices to the server. During the reclaim period, the device 102 can communicate a reclaim request and associated metadata (e.g., as part of or in connection with the commit request) to the server 104, wherein the reclaim request can request that the server 104 perform the commit operation to commit the data layout (e.g., metadata relating to the data layout) to the data store 106. The metadata can comprise the extent list data, mapping, device offsets, file offsets, FSBNs, storage offsets, extent lengths, extent states, and/or other metadata relating to the data layout.

In response to receiving the reclaim request, and based at least in part on the results of an analysis of the metadata received in connection with the reclaim request, the server 104, employing the file manager component 108, can reconstruct (e.g., recreate) a state of the metadata relating to the data layout and/or recreate the data layout. As part of the analysis of the metadata and reconstructing of the state of the metadata, the file manager component 108 can determine whether the commit of the data layout actually has already occurred (e.g., prior to the server disruption), where, for instance, the file manager component 108 can utilize the metadata (e.g., FSBNs and/or other metadata) associated with the reclaim request and can examine the allocation statuses of respective storage locations associated with the respective FSBNs to determine whether those storage locations are already allocated. If the file manager component 108 determines that those storage locations are already allocated, the file manager component 108 can determine that the commit of the data layout actually has already occurred (e.g., prior to the server disruption). In such case, the server 104 can communicate a notification message to the device 102, wherein the notification message can indicate or notify that the data layout (e.g., the metadata relating to or representative of the data layout) has been successfully committed to the data store 106 of the server 104.

If, instead, based at least in part on the metadata and the examination of the allocation statuses of respective storage locations associated with the respective FSBNs, the file manager component 108 determines that those storage locations are not allocated, the file manager component 108 can perform exact block preference-based block allocation (which also can be referred to as exact storage location preference-based storage location allocation) to allocate those particular storage locations associated with the metadata associated with the reclaim request, to facilitate performance of the data layout commit. With the storage locations (e.g., group of storage locations) being re-allocated, the file manager component 108 can perform the commit operation to commit the data layout (e.g., the metadata relating to the data layout) to the data store 106 of the server 104. After successful completion of the data layout commit, the server 104 can communicate a notification message to the device 102, wherein the notification message can indicate or notify that the data layout (e.g., the metadata relating to or representative of the data layout) has been successfully committed to the data store 106 of the server 104.

These and other aspects and embodiments of the disclosed subject matter will not be described, or further described, with regard to the other drawings.

Figure 2:
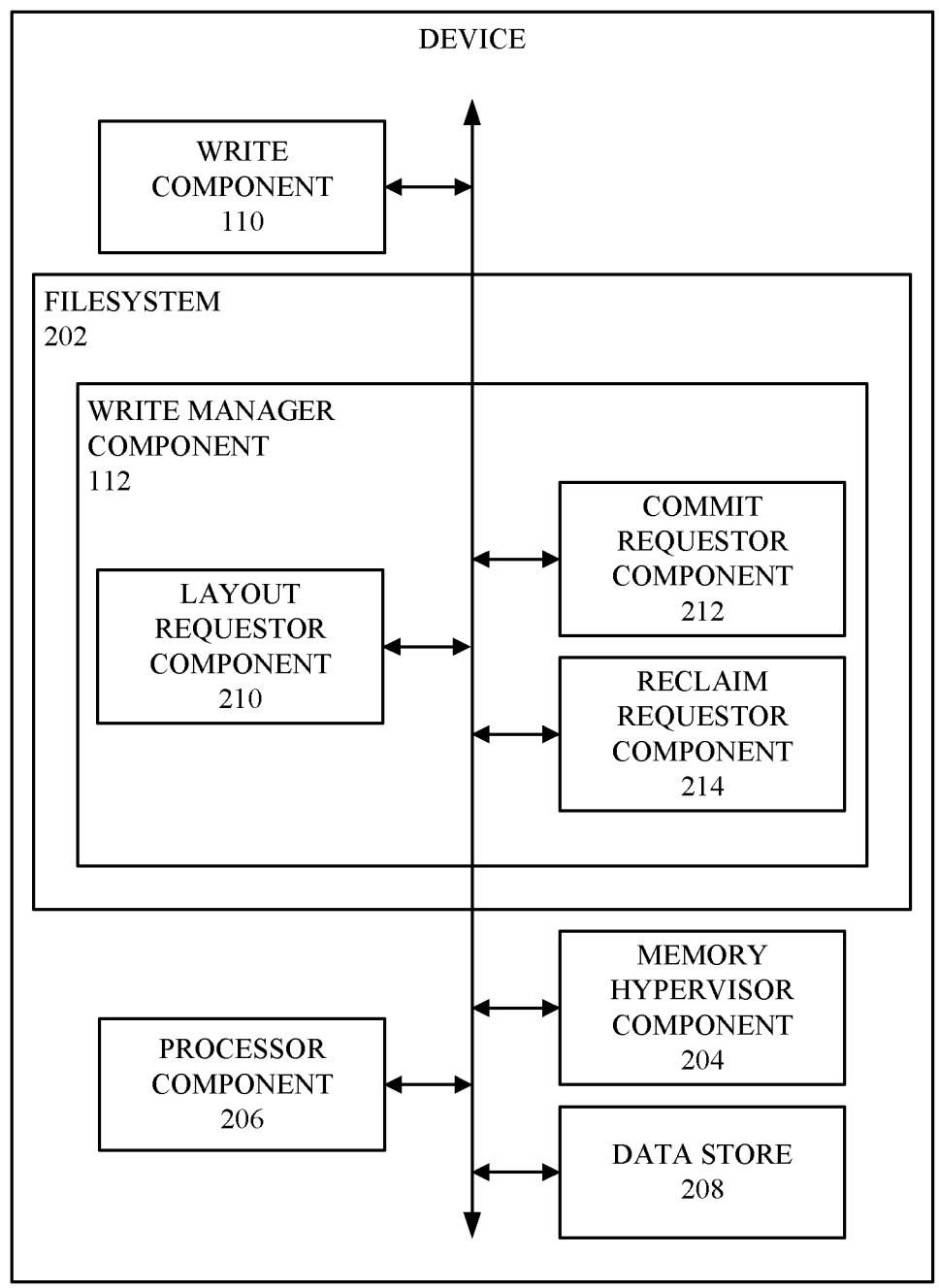
FIG. 2 depicts a block diagram of a non-limiting example device, in accordance with various aspects and embodiments of the disclosed subject matter.
Figure 3:
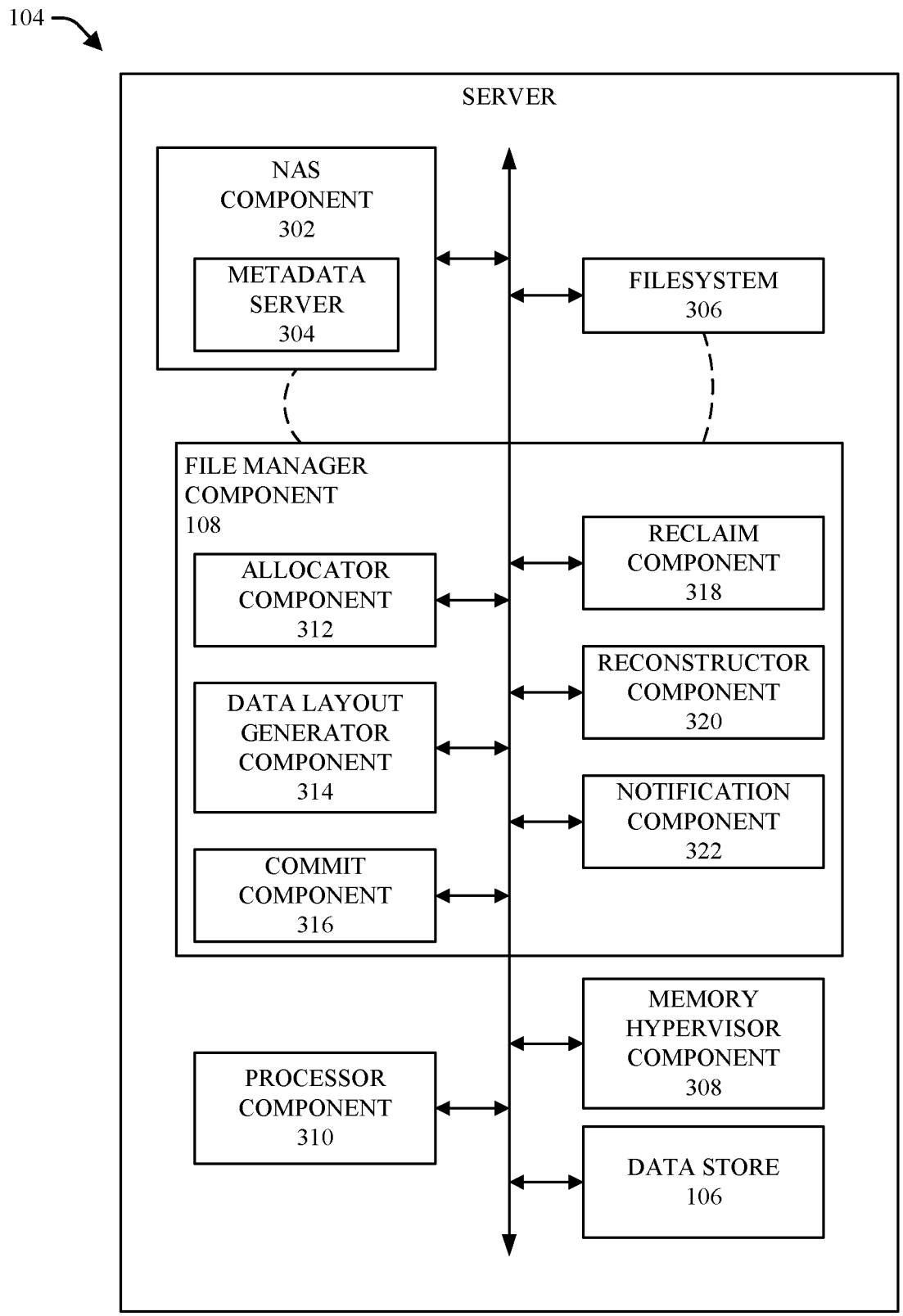
FIG. 3 depicts a block diagram of a non-limiting example server, in accordance with various aspects and embodiments of the disclosed subject matter.

Referring to FIGS. 2 and 3 (along with FIG. 1), FIG. 2 depicts a block diagram of a non-limiting example device 102, and FIG. 3 depicts a block diagram of a non-limiting example server 104, in accordance with the various aspects and embodiments of the disclosed subject matter. The device 102 can comprise a filesystem 202 (e.g., parallel filesystem) that can operate in parallel with the filesystem of the server 104 to facilitate direct writing of data by the device 102 to the data store 106 of the server 104 out of band of the server 104, such as described herein. The device 102 also can comprise a memory hypervisor component 204, a processor component 206, and one or more data stores, such as data store 208, that can be associated with the filesystem 202, each other, and/or other components of the device 102.

The one or more data stores (e.g., data store 208) can comprise non-volatile memory and/or volatile memory that can be utilized to store data, such as data of files, metadata associated with files, and/or other desired data. The memory hypervisor component 204 can facilitate interfacing or interactions between the filesystem 202 and the one or more data stores (e.g., data store 208), and managing allocation of memory resources of the one or more data stores to the filesystem 202, the processor component 206, and/or other components of the device 102, including virtual machines (VMs) of or associated with the filesystem 202, the processor component 206, and/or other components of the device 102. In some embodiments, the one or more data stores (e.g., data store 208) of the device 102 can comprise a non-volatile memory express (NVMe) or NVMe over fabric (NVMe-oF) data store and/or a persistent memory (PMEM) or PMEM-oF data store, although, in other embodiments, the one or more data stores can comprise another type of data store or memory.

In accordance with various embodiments, the filesystem 202 can comprise or be associated with the write component 110 and/or the write manager component 112 to facilitate the writing of the data (e.g., data of files) to a server, such as the server 104, writing of data to the one or more local data stores (e.g., data store 208) of the device 102, and/or the management of the writing of data and files to the server (e.g., server 104) or the one or more local data stores of the device 102, such as described herein.

With regard to the server 104, in accordance with various embodiments, the server 104 can comprise a network attached storage (NAS) component 302, which can comprise or be associated with a metadata server 304. The NAS component 302 and metadata server 304 can manage the writing, reading, and/or storage of data to, from, and/or in one or more data stores (e.g., data store 106) or other memory of the server 104. The metadata server 304 can determine and generate metadata, such as metadata relating to data layouts associated with files, to facilitate the writing of data (e.g., by devices, such as the device 102) to the data store 106, wherein the metadata can comprise extent list data, mappings relating to storage locations in the data store 106, device offsets associated with the one or more data stores (e.g., data store 106), file offsets associated with files, FSBNs associated with file offsets, storage offsets associated with the one or more data stores, extent lengths of extents, states of extents, or other type of metadata.

The server 104 also can comprise a filesystem 306 that can manage files stored in the one or more data stores (e.g., data store 106) of the server 104. In some embodiments, the filesystem 306 can operate in parallel with the filesystem 202 of the device 102 to facilitate (e.g., enable) the device 102 directly writing data to the data store 106 of the server 104 out of band of the server 104, such as described herein. The server 104 further can comprise a memory hypervisor component 308, a processor component 310, and the one or more data stores, such as data store 106, that can be associated with the NAS component 302, the filesystem 306, each other, and/or other components of the server 104.

The one or more data stores (e.g., data store 106) can comprise non-volatile memory and/or volatile memory that can be utilized to store data, such as data of files, metadata associated with files, and/or other desired data. The memory hypervisor component 308 can facilitate interfacing or interactions between the filesystem 306 and the one or more data stores (e.g., data store 106), and managing allocation of memory resources of the one or more data stores to the filesystem 306, the processor component 310, and/or other components of the device 102, including VMs of or associated with the filesystem 306, the processor component 310, and/or other components of the server 104. In some embodiments, the one or more data stores (e.g., data store 106) of the server 104 can comprise an NVMe or NVMe-oF data store and/or a PMEM or PMEM-oF data store, although, in other embodiments, the one or more data stores can comprise another type of data store or memory.

In accordance with various embodiments, the NAS component 302 or filesystem 306 can comprise or be associated with the file manager component 108 to facilitate performing and/or managing commits of data layouts associated with files to the server 104, such as described herein. For instance, the file manager component 108 can be part of the filesystem 306, can be part of NAS component 302, can be separate from and associated with (e.g., communicatively connected to) the filesystem 306 and NAS component 302, or can have respective components of the file manager component 108 that can be part of the filesystem 306, the NAS component 302, or separate from and associated with the filesystem 306 and NAS component 302. (In FIG. 3, the dotted line between the file manager component 108 and the filesystem 306, and the dotted line between the file manager component 108 and the NAS component 302, are intended to indicate that the file manager component 108 can be part of the filesystem 306, can be part of NAS component 302, can be separate from and associated with the filesystem 306 and NAS component 302, or can have respective components of the file manager component 108 that can be part of the filesystem 306, the NAS component 302, or separate from and associated with the filesystem 306 and NAS component 302.) When the device 102, or associated user, desires to write data to a file (e.g., a new file or existing file), the write manager component 112 of the device 102, employing a layout requestor component 210, can communicate a request to obtain a data layout relating to the file to the server 104 to facilitate writing data to the data store 106 of the server 104. The request to obtain the data layout can be in the form of a get layout call or other type of call or operation that can be utilized to request to obtain the file layout.

In response to receiving the request to obtain the data layout relating to the file from the device 102, the file manager component 108 of the server 104, employing an allocator component 312, can analyze information relating to storage locations of the data store 106, and, based at least in part on the results of such analysis, the allocator component 312 can determine a group of storage locations in the data store 106 that is available to write data to the file and can preallocate or assign the group of storage locations to the data layout and associated file. For instance, the allocator component 312 can identify a group of storage locations in the data store 106 that do not have any data (e.g., valid data) stored therein or that are otherwise available for use by the device 102 to write and store data associated with the file.

With regard to the group of storage locations, the file manager component 108 can employ a data layout generator component 314 that can generate the data layout associated with the file, and, as part of generating the data layout, can determine and generate metadata, such as extent list data, relating to the group of storage locations. The metadata can comprise a list of extents and/or a mapping of the group of storage locations in the data store 106 to which the device 102 is able to write data to the file. The list of extents and/or the mapping can comprise information (e.g., extent and/or mapping information) such as, for example, device offsets associated with the group of storage locations of the data store 106 that is part of the data layout, file offsets associated with the file, FSBNs (which also can be referred to as filesystem storage location numbers) associated with the file offsets, storage offsets associated with the group of storage locations, the lengths of the extents, the states of the extents, and/or other desired metadata relating to the data layout. In some embodiments, the data layout generator component 314 can obtain certain metadata, such as the FSBNs associated with the extents from the filesystem 306 (e.g., from memory of the filesystem 306). In certain embodiments, an extent FSBN from the filesystem 306 can be or can comprise a struct (e.g., a preallocation extent struct) that can comprise a mapping index that can indicate or identify an index into the mapping array, a count of consecutive allocation units (AUs), an FSBN that can indicate an offset of the filesystem block of the first allocation unit in the extent, a quality of service (QoS) for compression (e.g., compression of data), a file offset for compression, and/or other metadata relating to the extent or FSBN.

The server 104 can communicate the data layout, comprising the metadata, relating to the file to the device 102. In some embodiments, the server 104 (e.g., the file manager component 108, metadata server 304, or other component of the server 104) can maintain the state that can describe the group of storage locations (e.g., filesystem blocks) and other metadata resources that are preallocated corresponding to the file offsets and/or FSBNs from the data layout provided to the device 102 in response to the data layout request. The server 104 can utilize such information (e.g., metadata) relating to the state to facilitate performing the commit operation, if and when the device 102 requests that a commit be performed with respect to the file, such as described herein.

Figure 4:
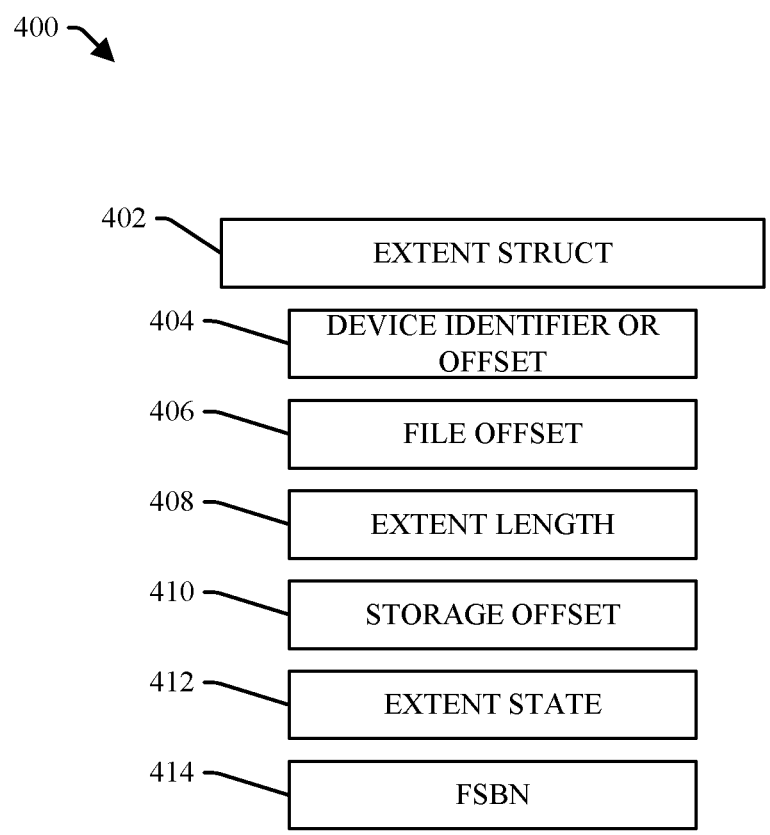
FIG. 4 illustrates a block diagram of non-limiting example extent layout relating to an extent of metadata relating to a data layout associated with a file, in accordance with the various aspects and embodiments of the disclosed subject matter.

Referring to FIG. 4 (along with FIGS. 1-3), FIG. 4 illustrates a block diagram of non-limiting example extent layout 400 relating to an extent of metadata relating to a data layout associated with a file, in accordance with the various aspects and embodiments of the disclosed subject matter. The example extent layout 400 can be or can comprise an extent struct 402 that can be a metadata or extent structure for an extent. There can be one or more extents associated with a data layout depending in part on the size of the data layout, the availability of storage locations of the data store 106, the relative locations of the storage locations (e.g., whether storage locations are contiguous or non-contiguous in relation to each other), and/or other factors.

As part of or in accordance with the extent struct, the extent layout 400 can comprise a device identifier or offset 404 that can identify a logical volume on which the extent of the file can be stored; a file offset 406 that can indicate or identify the starting byte offset in the file; an extent length 408 that can indicate or identify the size in bytes of the extent; a storage offset 410 that can indicate or specify the starting byte off set in the volume (e.g., logical volume); an extent state 412 that can indicate or identify the state of the extent; and an FSBN 414 that can indicate or specify the starting FSBN for the file offset of the extent. In some embodiments, the extent layout 400 can comprise one or more other types of metadata, as desired.

The device 102 can receive the data layout, comprising the extent list data (e.g., comprising the one or more extents) and/or other metadata, relating to the file from the server 104. The device 102 can utilize the data layout and associated metadata to write respective items of data to respective storage locations of the group of storage locations based at least in part on (e.g., in accordance with) the metadata (e.g., the one or more extents in the extent list data). In some embodiments, the write component 110 of the device 102 can write the data directly to the respective storage locations in the data store 106 of the server 104 out of band from the server 104 (e.g., without involving the server (e.g., server processing resources) in the data write stack). After the writing of the respective items of data to the respective storage locations in the data store 106 and before committing of the data layout associated with the file, the respective items of data can be persisted in the data store 106, although the data layout, which can indicate where the respective items of data are stored in the data store 106, is not yet persisted in the data store 106. After the device 102 (or associated user) is finished writing the respective items of data of the file to respective storage locations of the group of storage locations of the data store 106 or otherwise interacting with the file, and/or desires to save and/or close the file, the device 102 (or associated user) can desire to commit and store the data layout (e.g., the metadata relating to the data layout) associated with the file in the data store 106 because the data layout can indicate the respective storage locations where the respective items of data are stored in the data store 106.

To facilitate saving and persisting the data layout, the device 102 can employ a commit requestor component 212 that can generate a commit request and/or associated metadata relating to the data layout (e.g., can retrieve the metadata from the data store 208) and communicate the commit request and the metadata (e.g., in connection with or as part of the commit request) to the server 104 to request that the server 104 perform a commit operation to commit the metadata (e.g., the mapping and other associated metadata) associated with the file layout to the data store 106. For example, the commit requestor component 212 can encode the metadata, including the FSBNs associated with the file offsets associated with the extents in the extent list (e.g., the FSBNs for extents obtained during the data layout request), in the commit request, and can communicate the commit request and associated metadata to the server 104. The metadata can comprise the extent list data, mapping, device offsets associated with the group of storage locations of the data store 106 that is part of the data layout, file offsets associated with the file, FSBNs associated with the file offsets, storage offsets associated with the group of storage locations, the lengths of the extents, the states of the extents, and/or other desired metadata associated with the data layout, wherein the mapping can indicate the respective storage locations in the data store 106 to which the write component 110 has written the respective items of data. It is noted that, in certain embodiments, the device 102 can maintain the metadata relating to the data layout in the data store 208 at least until the device 102 receives a notification message indicating that the committing of the metadata relating to the data layout to the data store 106 of the server 104 has been successfully completed.

In some embodiments, in response to receiving the commit request and associated metadata associated with the data layout and file, the server 104 can employ a commit component 316 that can perform a commit operation to commit and/or store the metadata, including the mapping, to and/or in the data store 106, based at least in part on the metadata, including the extent list data and/or the mapping. The committing of the metadata associated with the file and data layout to the data store 106 can render the metadata and/or associated data layout persistent on the data store 106. This metadata associated with the file that is persisted in the data store 106 can enable the device 102, another device (e.g., another authorized device), and/or the server 104 to retrieve the respective items of data from the respective first storage locations in the data store 106, if and when desired.

However, in some instances, before the server 104 can perform the commit operation to commit the data layout to the data store 106, there may be a disruption (e.g., interruption or crash) of operation or service of the server 104. In such instances, due to the server disruption, the server 104 can lose the metadata relating to the data layout, as the metadata may have been stored in volatile memory of the server 104. In some other instances, the server 104 may have been able to commit the metadata relating to the data layout prior to such server disruption occurring, however, the server disruption occurs before the server 104 can communicate a notification message to the device 102 to notify the device 102 that the metadata relating to the data layout was successfully committed to the data store 106 of the server 104. The file manager component 108 and the techniques described herein can desirably (e.g., efficiently, suitably, enhancedly, or optimally) overcome these and other potential problems that can occur due to server disruption or other disruption of operations associated with the server 104 that can impact (e.g., negatively impact) operations relating to committing of data layouts.

If and when a disruption of operation or services of the server 104 occurs, various requests, operations, and information (e.g., information, including metadata, stored in volatile memory) associated with the server 104 can be lost. To facilitate recovering from the server disruption, the server 104 can utilize a reclaim period of a desired time duration to allow or enable devices, such as the device 102, to submit reclaim requests that can request that the server 104 service requests, including data layout commit requests, and perform operations, such as data layout commit operations, that were or may have been lost due to the server disruption. In some embodiments, the server 104 can comprise a reclaim component 318 that can initiate and manage a reclaim period and reclaim operations during the reclaim period. In certain embodiments, the reclaim component 318 can coordinate or operate in conjunction with other components (e.g., allocator component 312, commit component 316, metadata server 304, and/or other component) of the server 104 to facilitate performing operations (e.g., commit operations, exact block preference-based block allocation operations, notification operations, and/or other operations) in connection with performing or servicing reclaim requests or associated requests (e.g., data layout commit requests).

The device 102 can comprise functionality that can enable the device 102 to detect or be made aware of the disruption of the operation or service of the server 104, detect or be made aware of the resolving of the server disruption where the server 104 can be available to perform operations and provide services again, and/or detect or be made aware of the reclaim period during which reclaim requests can be submitted by the devices to the server. In response to the device 102 detecting or being made aware of the server disruption of the server 104, the resolving of the server disruption, and/or the initiation of the reclaim period, and during the reclaim period, the device 102 can employ a reclaim requestor component 214 that can generate a reclaim request and/or associated metadata (e.g., can retrieve the metadata relating to the data layout from the data store 208 of the device 102), and can communicate the reclaim request and associated metadata (e.g., as part of or in connection with the commit request) to the server 104, wherein the reclaim request can request that the server 104 perform the commit operation to commit the metadata relating to the data layout to the data store 106. For example, the reclaim requestor component 214 can encode the metadata, including the FSBNs associated with the file offsets associated with the extents in the extent list (e.g., the FSBNs for extents obtained during the data layout request), in the reclaim request, and can communicate the reclaim request and associated metadata to the server 104. The metadata can comprise the extent list data, mapping, device offsets, file offsets, FSBNs, storage offsets, extent lengths, extent states, and/or other metadata relating to the data layout. For example, the reclaim request can comprise the same or similar metadata that the device 102 provided in connection with the commit request.

In some embodiments, the file manager component 108 can comprise a reconstructor component 320 that can facilitate reconstructing a state or the metadata relating to a data layout and/or recreating the data layout, based at least in part on the metadata received as part of the reclaim request. For instance, in response to receiving the reclaim request and associated metadata, and based at least in part on the results of an analysis of the received metadata, the reconstructor component 320 can reconstruct (e.g., recreate) a state of the metadata relating to the data layout and/or recreate the data layout. As part of the analysis of the metadata and reconstructing of the state of the metadata, the reconstructor component 320 can determine whether the commit of the data layout actually has already occurred (e.g., prior to the server disruption), where, for instance, the reconstructor component 320 can utilize the received metadata (e.g., FSBNs and/or other metadata) associated with the reclaim request and can examine the allocation statuses of respective storage locations associated with the respective FSBNs to determine whether those storage locations are already allocated. If the reconstructor component 320 determines that those storage locations are already allocated, the reconstructor component 320 can determine that the commit of the metadata relating to the data layout actually has already occurred (e.g., prior to the server disruption). In certain embodiments, the reconstructor component 320 (e.g., of or associated with the filesystem 306) can parse each of the extents of the metadata and, with regard to the extent, examine the FSBN at the file offset in the metadata to determine whether the FSBN satisfies a defined matching criterion (e.g., matches) with respect to an existing FSBN and/or mapping already stored in the data store 106. If, based at least in part on such analysis (e.g., parsing and examining of the metadata), the reconstructor component 320 determines that the FSBN at the file offset in the received metadata satisfies the defined matching criterion (e.g., matches) with respect to an existing FSBN and/or mapping already stored in the data store 106 (e.g., for all of the extents in the received metadata), the reconstructor component 320 can determine that the metadata relating to the data layout already has been committed to the data store 106 (e.g., prior to the server disruption).

If the reconstructor component 320 determines that the metadata relating to the data layout already has been committed to the data store 106, the reclaim component 318 can determine that the reclaim request can be discarded or ignored, and, accordingly, can discard or ignore the reclaim request. Also, the server 104, employing a notification component 322, can communicate a notification message to the device 102, wherein the notification message can indicate or notify that the data layout (e.g., the metadata relating to or representative of the data layout) has been successfully committed to the data store 106 of the server 104.

If, instead, based at least in part on the metadata and the examination of the allocation statuses of respective storage locations associated with the respective FSBNs, the reconstructor component 320 determines that those storage locations are not allocated, the reconstructor component 320 and/or the allocator component 312 can perform exact block preference-based block allocation (which also can be referred to as exact storage location preference-based storage location allocation) to allocate those particular (e.g., exact) storage locations (e.g., allocate the particular FSBNs associated with the particular storage locations of the group of storage locations) associated with the metadata associated with the reclaim request, to facilitate performance of the data layout commit. In certain embodiments, the reconstructor component 320 can determine that exact block preference-based block allocation is to be performed to re-allocate the storage locations associated with the data layout, if, based at least in part on analysis of the received metadata (e.g., parsing and examining of the metadata), the reconstructor component 320 determines that the FSBN at the file offset in the received metadata does not satisfy the defined matching criterion (e.g., does not match) with respect to an existing FSBN and/or mapping already stored in the data store 106 (e.g., for all of the extents in the received metadata). For example, if, with regard to an extent of the received metadata relating to the data layout, and based at least in part on analysis of the received metadata, the reconstructor component 320 determines that there is a gap (e.g., no FSBN) or a different FSBN associated with a file offset in the data store 106 when compared to the FSBN associated with the file offset associated with the extent, the reconstructor component 320 can determine that the metadata relating to the data layout is not yet committed to the data store 106 (e.g., the received metadata does not match the information that is stored in the data store 106, and thus, the data layout has not yet been committed to the data store 106), and also can determine that exact block preference-based block allocation is to be performed to re-allocate the storage locations associated with the data layout. The reconstructor component 320 and/or the allocator component 312 can utilize the received metadata (e.g., FSBNs and/or other metadata received in connection with the reclaim request) to facilitate performing the exact block preference-based block allocation. It is noted that, during the reclaim period (e.g., the grace period for reclaim requests and reclaim operations), exact block preference-based block allocation can be performed without data corruption or collisions (e.g., data or operation collisions) occurring because the filesystem 306 is not opened up for general operations that can cause block allocations.

With the storage locations (e.g., group of storage locations) associated with the data layout being re-allocated (e.g., by performing the exact block preference-based block allocation), the reclaim component 318 and/or commit component 316 can perform the commit operation to commit the metadata relating to the data layout to the data store 106 of the server 104. After successful completion of the data layout commit, the notification component 322 can communicate a notification message to the device 102, wherein the notification message can indicate or notify that the data layout (e.g., the metadata relating to or representative of the data layout) has been successfully committed to the data store 106 of the server 104. In some embodiments, after or in response to the device 102 receiving the notification message indicating the successful committing of the metadata relating to the data layout to the data store 106 of the server 104, the write manager component 112 can discard the metadata relating to the data layout that is stored in the data store 208 of the device 102.

Figure 5:
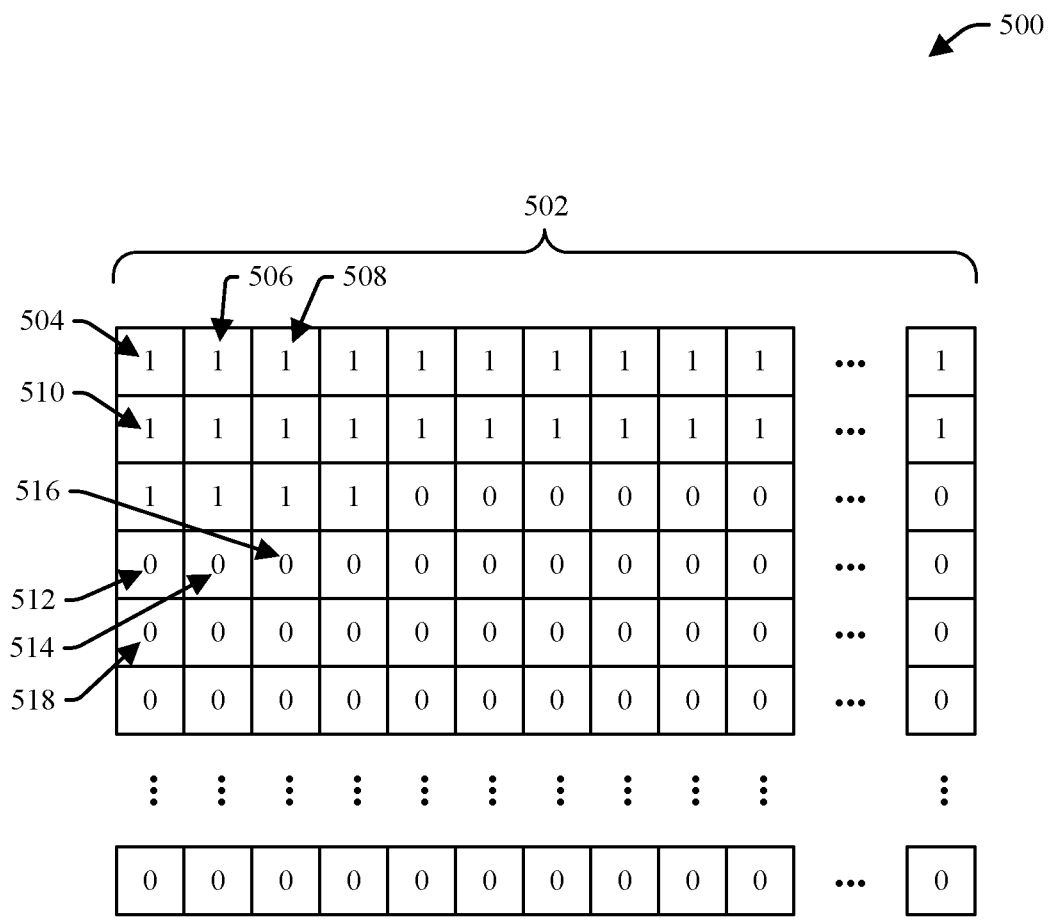
FIG. 5 illustrates a block diagram of a non-limiting example bitmap that can be utilized to facilitate determining respective allocation statuses of respective blocks of the data store 106, and/or determining whether received metadata relating to a data layout and associated with a reclaim request matches metadata stored in the data store 106 of the server 104, in accordance with various aspects and embodiments of the disclosed subject matter.

With further regard to determining whether the received metadata relating to the data layout matches metadata stored in the data store 106, which can indicate whether the commit of the metadata relating to the data layout actually had been successfully performed (e.g., prior to the server disruption, in some embodiments, the file manager component 108 can employ bitmaps relating to respective portions of the logical address space of the data store 106, or desired portion of the data store 106, that can indicate respective allocation statuses (e.g., allocated or not allocated) of respective blocks (e.g., logical blocks or storage locations) of the data store 106. Referring briefly to FIG. 5 (along with FIGS. 1-4), FIG. 5 illustrates a block diagram of a non-limiting example bitmap 500 that can be utilized to facilitate determining respective allocation statuses of respective blocks of the data store 106, and/or determining whether received metadata relating to a data layout and associated with a reclaim request matches metadata stored in the data store 106 of the server 104, in accordance with various aspects and embodiments of the disclosed subject matter. In certain embodiments, the file manager component 108 can partition (e.g., divide) a group of logical blocks of a logical address space of the data store 106 into respective subgroups of logical blocks, wherein the group of logical blocks can correspond to the group of physical blocks (e.g., physical storage locations) in the data store 106. For example, the file manager component 108 can partition the group of logical blocks of the logical address space of the data store 106 into respective subgroups of logical blocks that can be 64 megabytes (MB) in size, or less than or greater than 64 MB in size, as desired. The file manager component 108 (e.g., employing the allocator component 312 or other component of the file manager component 108 or server 104) can maintain respective allocation statuses of the respective subgroups of logical blocks in respective bitmaps, such as the example bitmap 500.

In the example bitmap 500, the bitmap 500 can comprise a subgroup of bit blocks 502 associated with a subgroup of logical blocks (e.g., 64 MB or other desired sized portion of logical blocks) of the logical address space of the data store 106. The subgroup of bit blocks 502 can comprise respective bit blocks, such as, for example, bit blocks 504, 506, 508, 510, 512, 514, 516, and 518. As presented in the example bitmap 500, the file manager component 108 (e.g., employing the allocator component 312 or other component of the file manager component 108 or server 104) can set the respective bits of respective bit blocks (e.g., bit blocks 504, 506, 508, and 510) to a first bit value that can indicate that the corresponding logical blocks in the subgroup of logical blocks have been allocated (e.g., a bit value of 1 or other desired bit value that can indicate such logical block is allocated), and can set (or can maintain as unset) the respective bits of respective bit blocks (e.g., bit blocks 512, 514, 516, and 518) to a second bit value that can indicate that the corresponding logical blocks in the subgroup of logical blocks are not allocated (e.g., a bit value of 0 or other desired bit value that can indicate such logical block is not allocated).

When the file manager component 108 (e.g., the allocator component 312, reconstructor component 320, or other component) is analyzing the received metadata relating to the data layout (e.g., associated with the reclaim request) in relation to the metadata stored in the data store 106, the file manager component 108 can analyze the bitmap (e.g., bitmap 500) comprising the bit blocks associated with the logical blocks that are associated with (e.g., that correspond, map, or link to) the metadata values of the received metadata (e.g., FSBN(s) and associated file offset(s), and/or other metadata of the received metadata) to determine whether those logical blocks associated with the bit blocks in that bitmap are allocated or not. If the bit values of the bit blocks (e.g., bit blocks 504, 506, 508, and 510) in the bitmap (e.g., 500) that are associated with the logical blocks that correspond to the received metadata have the first bit value (e.g., bit value of 1, or other bit value that indicates the block is allocated), the file manager component 108 can determine that those logical blocks associated with (e.g., represented by) those bit blocks have been allocated. If, instead, the bit values of the bit blocks (e.g., bit blocks 512, 514, 516, and 518) in the bitmap that are associated with the logical blocks that correspond to the received metadata have the second bit value (e.g., bit value of 0, or other bit value that indicates the block is not allocated), the file manager component 108 can determine that those logical blocks associated with (e.g., represented by) those bit blocks are not allocated.

If the file manager component 108 determines that the logical blocks associated with the received metadata are allocated based at least in part on the results of analyzing the bitmap (e.g., bitmap 500), the file manager component 108 (e.g., reconstructor component 320 or other component of the file manager component 108) can determine that the metadata associated with the data layout already has been committed to the data store 106 or at least potentially already has been committed to the data store 106 (e.g., prior to the server disruption). If, instead, the file manager component 108 determines that the logical blocks associated with the received metadata are not allocated based at least in part on the results of analyzing the bitmap (e.g., bitmap 500), the file manager component 108 (e.g., reconstructor component 320 or other component of the file manager component 108) can determine that the metadata associated with the data layout has not been committed to the data store 106 or at least potentially already has not been committed to the data store 106 (e.g., prior to the server disruption).

It is to be appreciated and understood that the device 102 can have one or more files associated with one or more data layouts that can be open at the same time, wherein the device 102 can write data to the one or more files in accordance with the one or more data layouts. It also is to be appreciated and understood that the server 104 can manage respective data layouts associated with respective devices, including the device 102, in parallel or simultaneously, wherein the respective devices can write respective data to respective storage locations in the data store 106, in accordance with the respective data layouts, in parallel or simultaneously.

With further regard to the processor component 206 of the device 102, the processor component 206 can work in conjunction with the other components (e.g., write component 110, write manager component 112, filesystem 202, memory hypervisor component 204, data store 208, and/or other component) to facilitate performing the various functions of the device 102. The processor component 206 can employ one or more processors (e.g., one or more CPUs), microprocessors, or controllers that can process information relating to data, files, applications, services, requests (e.g., data layout requests, commit requests, reclaim requests), data layouts, data processing operations, commits, extents, extent lists, offsets, FSBNs, notifications, alarms, alerts, preferences (e.g., user or client preferences), hash values, metadata, parameters, traffic flows, policies, defined write or file management criteria, algorithms (e.g., write or file management-related algorithms, hash algorithms, data compression algorithms, data decompression algorithms, and/or other algorithm), interfaces, protocols, tools, and/or other information, to facilitate operation of the device 102, and control data flow between the device 102 and/or other components (e.g., server, another device, node, service, user, or other entity) associated with the device 102.

With further regard to the data store 208 of the device 102, the data store 208 can store data structures (e.g., user data, metadata), code structure(s) (e.g., modules, objects, hashes, classes, procedures) or instructions, information relating to data, files, applications, services, requests (e.g., data layout requests, commit requests, reclaim requests), data layouts, data processing operations, commits, extents, extent lists, offsets, FSBNs, notifications, alarms, alerts, preferences (e.g., user or client preferences), hash values, metadata, parameters, traffic flows, policies, defined write or file management criteria, algorithms (e.g., write or file management-related algorithms, hash algorithms, data compression algorithms, data decompression algorithms, and/or other algorithm), interfaces, protocols, tools, and/or other information, to facilitate controlling or performing operations associated with the device 102. The data store 208 can comprise volatile and/or non-volatile memory, such as described herein. In an aspect, the processor component 206 can be functionally coupled (e.g., through a memory bus) to the data store 208 in order to store and retrieve information desired to operate and/or confer functionality, at least in part, to the write component 110, write manager component 112, filesystem 202, memory hypervisor component 204, processor component 206, data store 208, and/or other component of the device 102, and/or substantially any other operational aspects of the device 102.

With further regard to processor component 310 of the server 104, the processor component 310 can work in conjunction with the other components (e.g., file manager component 108, NAS component 302, metadata server 304, filesystem 306, memory hypervisor component 308, data store 106, and/or other component) to facilitate performing the various functions of the server 104. The processor component 310 can employ one or more processors (e.g., one or more CPUs), microprocessors, or controllers that can process information relating to data, files, applications, services, requests (e.g., data layout requests, commit requests, reclaim requests), data layouts, data processing operations, commit operations, reclaim operations, block or storage location allocation or preallocation, extents, extent lists, offsets, FSBNs, notifications, alarms, alerts, preferences (e.g., user or client preferences), hash values, metadata, parameters, traffic flows, policies, defined file management criteria, algorithms (e.g., file management-related algorithms, hash algorithms, data compression algorithms, data decompression algorithms, and/or other algorithm), interfaces, protocols, tools, and/or other information, to facilitate operation of the server 104, and control data flow between the server 104 and/or other components (e.g., device, another server, node, service, user, or other entity) associated with the server 104.

With further regard to the data store 106 of the server 104, the data store 106 can store data structures (e.g., user data, metadata), code structure(s) (e.g., modules, objects, hashes, classes, procedures) or instructions, information relating to data, files, applications, services, requests (e.g., data layout requests, commit requests, reclaim requests), data layouts, data processing operations, commit operations, reclaim operations, block or storage location allocation or preallocation, extents, extent lists, offsets, FSBNs, notifications, alarms, alerts, preferences (e.g., user or client preferences), hash values, metadata, parameters, traffic flows, policies, defined file management criteria, algorithms (e.g., file management-related algorithms, hash algorithms, data compression algorithms, data decompression algorithms, and/or other algorithm), interfaces, protocols, tools, and/or other information, to facilitate controlling or performing operations associated with the server 104. The data store 106 can comprise volatile and/or non-volatile memory, such as described herein. In an aspect, the processor component 310 can be functionally coupled (e.g., through a memory bus) to the data store 106 in order to store and retrieve information desired to operate and/or confer functionality, at least in part, to the file manager component 108, NAS component 302, metadata server 304, filesystem 306, memory hypervisor component 308, processor component 310, data store 106, and/or other component of the server 104, and/or substantially any other operational aspects of the server 104.

It should be appreciated that the data stores (e.g., data store 106, data store 208) described herein can comprise volatile memory and/or nonvolatile memory. By way of example and not limitation, nonvolatile memory can include NVMe-oF, PMEM-oF, read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

It is to be appreciated and understood that the device 102 and/or the server 104 can comprise various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions.

In certain embodiments, the file manager component 108 and/or the write manager component 112 can comprise an artificial intelligence (AI) component that can employ, build (e.g., construct, create, and/or train), and/or import AI and/or ML models, neural networks (e.g., trained neural networks), and/or graph mining, and/or can employ AI and/or ML techniques and algorithms, to render and/or generate predictions, inferences, calculations, prognostications, estimates, derivations, forecasts, detections, and/or computations that can facilitate determining a pattern with regard to amounts of data written during write operations, determining resources to preallocate to a device, determining whether metadata relating to a data layout was already committed to the data store 106 of the server 104 prior to a server disruption, determining whether metadata relating to a data layout that is received in connection with a reclaim request matches metadata stored in the data store 106 of the server 104, determining whether exact block preference-based block allocation is to be performed in connection with a reclaim operation, and/or making other desired determinations, including the determinations described herein, and/or automating one or more functions or features of the disclosed subject matter (e.g., automating one or more functions or features of or associated with the file manager component 108, write manager component 112, device 102, server 104, or other component), as more fully described herein.

The AI component can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component can examine the entirety or a subset of the data (e.g., data associated with files, applications, devices, servers, or users; and/or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
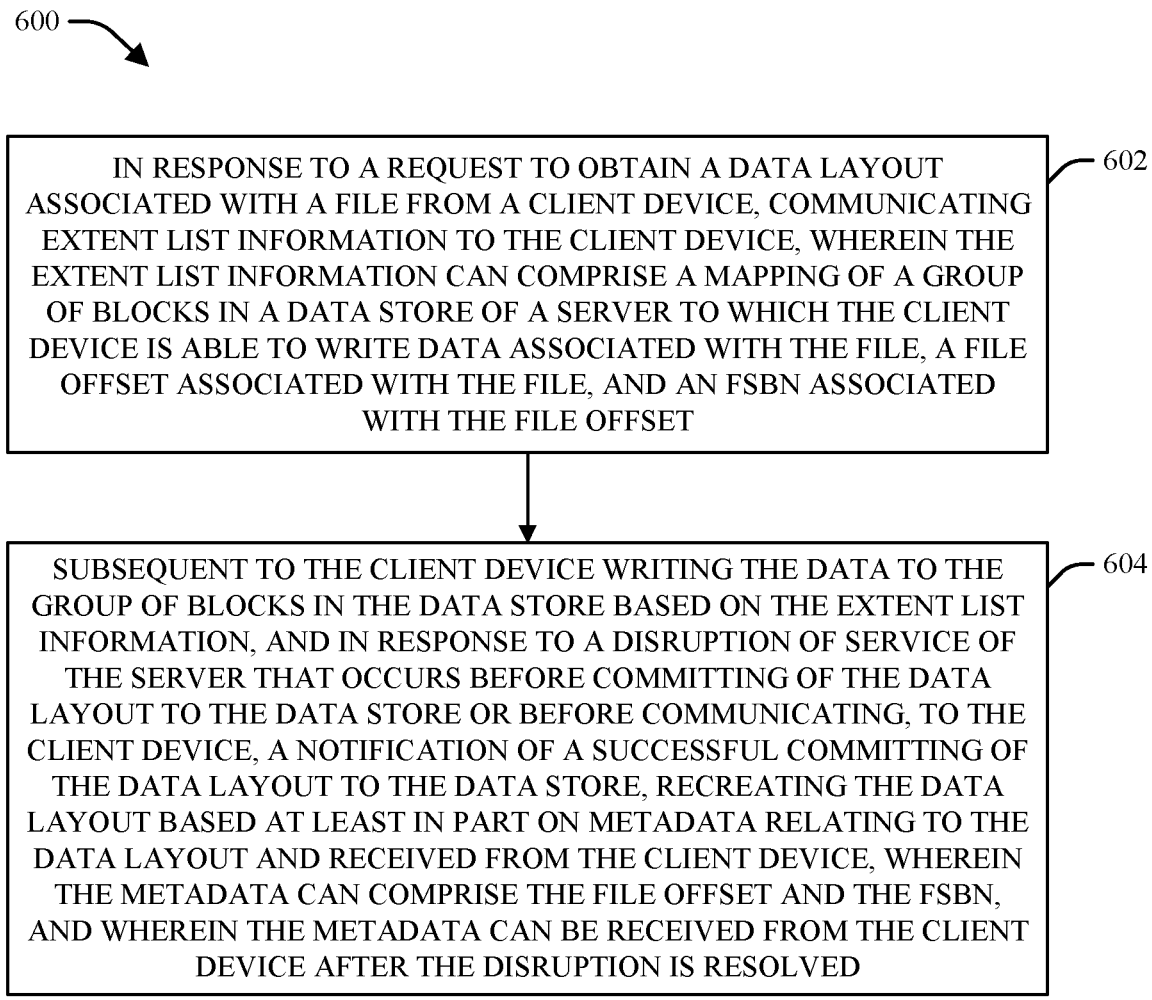
FIG. 6 illustrates a flow chart of an example method that can desirably perform and manage client data layout retention across server disruption, in connection with commits of data layouts associated with files of client devices to a data store of the server, in accordance with various aspects and embodiments of the disclosed subject matter.

FIG. 6 illustrates a flow chart of an example method 600 that can desirably (e.g., efficiently, suitably, enhancedly, or optimally) perform and manage client data layout retention across server disruption, in connection with commits of data layouts associated with files of client devices to a data store of the server, in accordance with various aspects and embodiments of the disclosed subject matter. The method 600 can be employed by, for example, a system comprising the server that can employ the file manager component, a processor component (e.g., of or associated with the file manager component), and/or data store (e.g., of or associated with the file manager component and/or the processor component).

At 602, in response to a request to obtain a data layout associated with a file from a client device, extent list information can be communicated to the client device, wherein the extent list information can comprise a mapping of a group of blocks in a data store of a server to which the client device is able to write data associated with the file, a file offset associated with the file, and an FSBN associated with the file offset. For instance, in response to the request to obtain the data layout received from the client device, the server can generate metadata relating to the data layout. The metadata can comprise, for example, the extent list information, which can comprise a mapping of a group of blocks in the data store of the server to which the client device is able to write data associated with the file, respective file offsets associated with the file, respective FSBNs associated with the respective file offsets, and/or other metadata, such as described herein. The server can communicate the metadata, comprising the extent list information and/or other metadata, relating to the data layout to the client device.

The client device can write (e.g., directly write) respective items of data to respective blocks of the group of blocks of the data store of the server (e.g., out of band from the server), in accordance with the data layout indicated or represented by the metadata. The client device can communicate a commit request, comprising the metadata relating to the data layout, to the server to request that the server commit the data layout (e.g., commit the metadata relating to the data layout) to the data store of the server. In some instances, there may be a disruption (e.g., interruption or crash) of operation or service of the server before the server can perform the commit operation to commit the data layout to the data store, or, where the server was able to commit the data layout prior to the server disruption, before the server can communicate a notification message to the client device to notify the client device that the data layout was successfully committed to the data store of the server.

At 604, subsequent to the client device writing the data to the group of blocks in the data store based on the extent list information, and in response to a disruption of service of the server that occurs before committing of the data layout to the data store or before communicating, to the client device, a notification of a successful committing of the data layout to the data store, the data layout can be recreated based at least in part on metadata relating to the data layout and received from the client device, wherein the metadata can comprise the file offset and the FSBN, and wherein the metadata can be received from the client device after the disruption is resolved. For instance, after the server disruption is resolved, there can be a reclaim period where the server can receive reclaim requests from client devices, such as the client device, to reclaim requests or operations that were lost due to the server disruption. During the reclaim period, the client device can communicate a reclaim request and the metadata relating to the data layout (e.g., as part of or in connection with the reclaim request) to the server to request that the data layout be committed to the data store of the server. The server, employing the file manager component, can recreate the data layout based at least in part on the metadata relating to the data layout that is received from the client device, wherein the metadata can comprise the file offsets, the FSBNs, and/or other metadata, such as described herein.

The file manager component can determine whether the data layout already was committed to the data store prior to the server disruption based at least in part on reconstruction of the state of the metadata, including performing exact block preference-based block allocation, using the metadata received from the client device in connection with the reclaim request, such as described herein. If the file manager component determines that the data layout has not been committed to the data store (e.g., prior to the server disruption), the file manager component can commit the data layout (e.g., the metadata relating to or representative of the data layout) to the data store based at least in part on the recreated data layout. If, instead, the file manager component determines that the data layout already was committed to the data store prior to the server disruption, the file manager component can discard or ignore the reclaim request and does not have to perform the data layout commit (e.g., since it already was performed), and can communicate a notification message to the client device to notify the client device that the data layout was successfully committed to the data store of the server.

Figure 7:
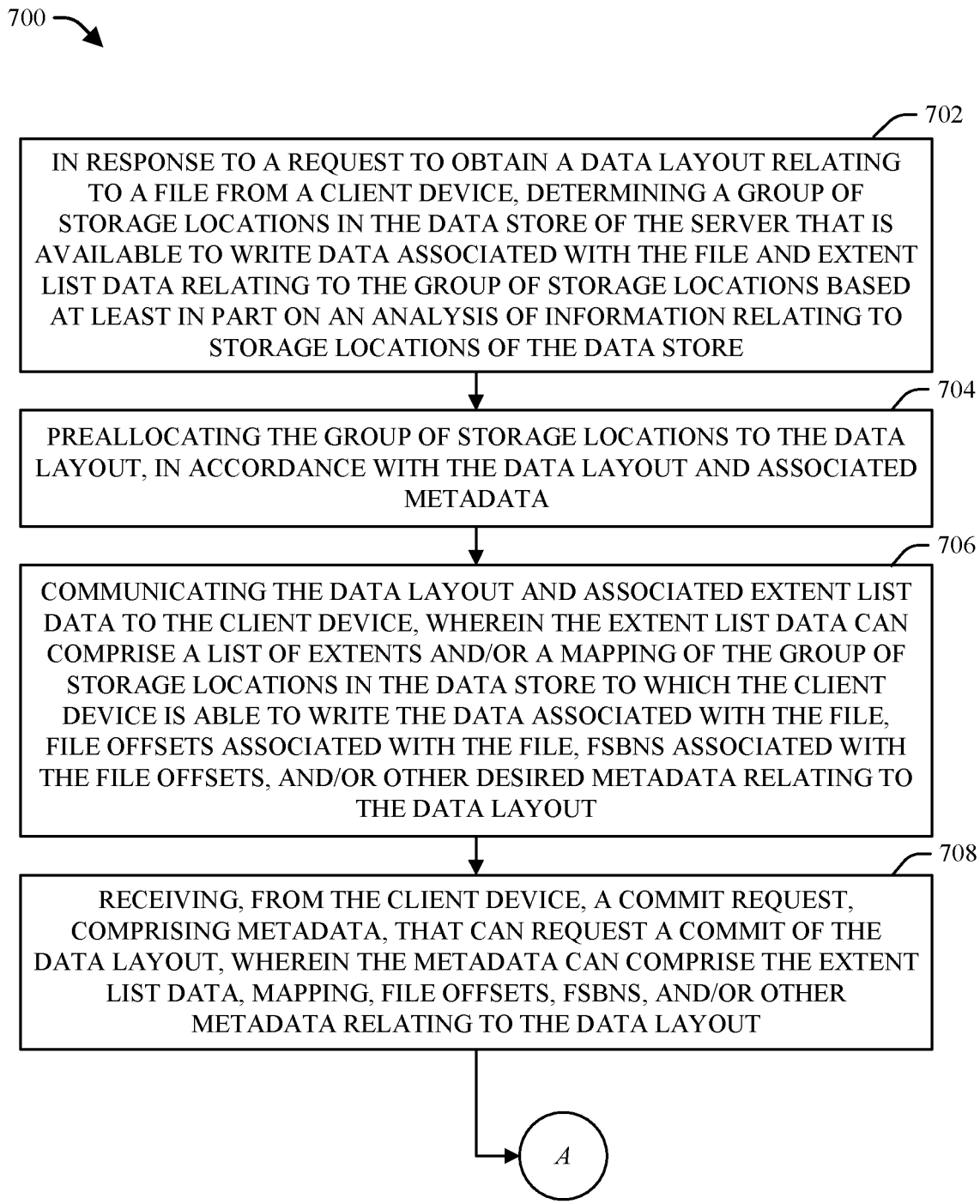
FIGS. 7-8 depict a flow chart of another example method that can desirably perform and manage client data layout retention across server disruption, in connection with commits of data layouts associated with files of client devices to a data store of the server, in accordance with various aspects and embodiments of the disclosed subject matter.
Figure 8:
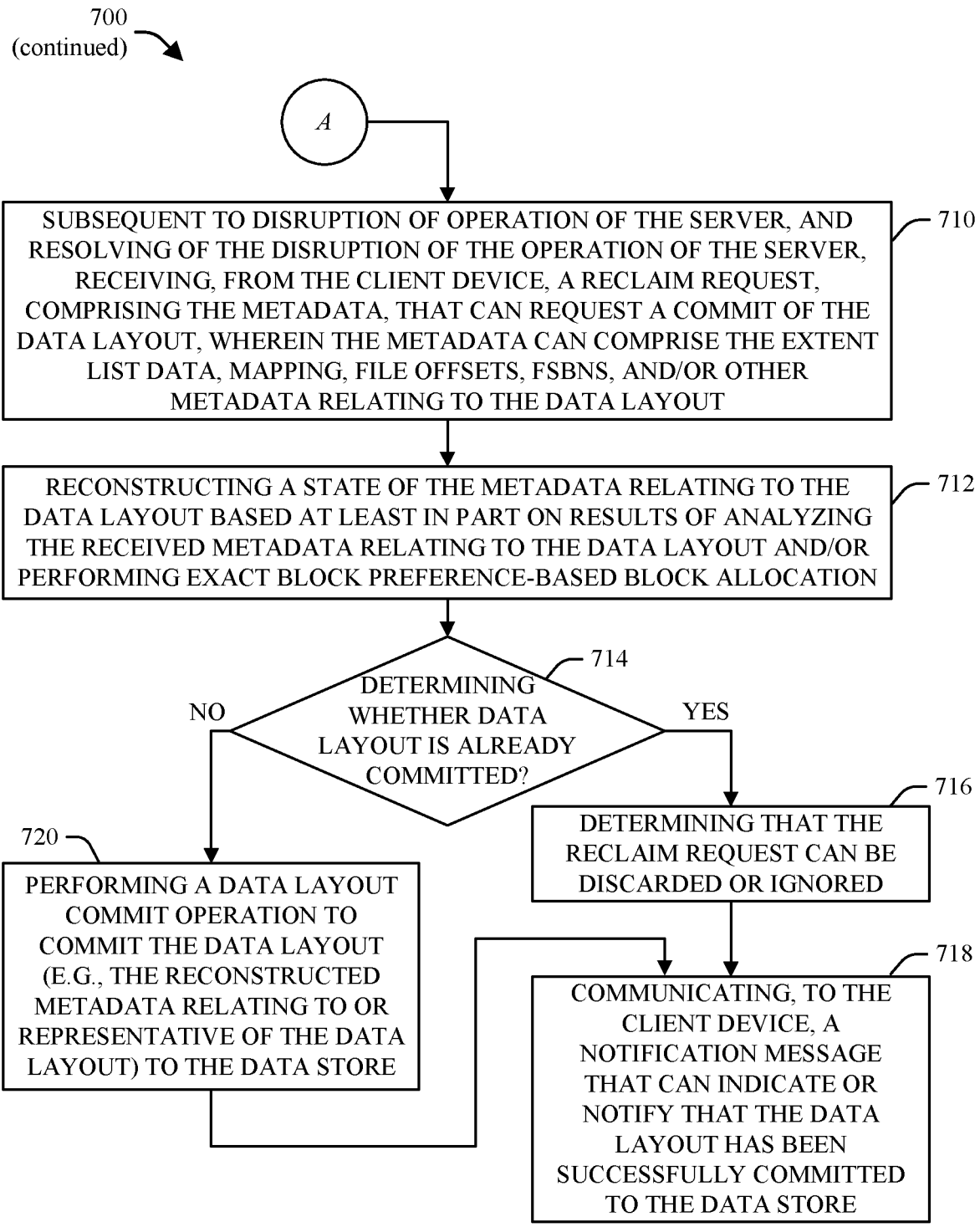

FIGS. 7 and 8 depict a flow chart of another example method 700 that can desirably (e.g., efficiently, suitably, enhancedly, or optimally) perform and manage client data layout retention across server disruption, in connection with commits of data layouts associated with files of client devices to a data store of the server, in accordance with various aspects and embodiments of the disclosed subject matter. The method 700 can be employed by, for example, a system comprising the server that can employ the file manager component, a processor component (e.g., of or associated with the file manager component), and/or data store (e.g., of or associated with the file manager component and/or the processor component).

At 702, in response to a request to obtain a data layout relating to a file from a client device, a group of storage locations in the data store of the server that is available to write data associated with the file and extent list data relating to the group of storage locations can be determined based at least in part on an analysis of information relating to storage locations of the data store. For instance, the server can receive the request to obtain the data layout. The server, employing the file manager component, can analyze the information relating to the storage locations of the data store, and, based at least in part on the results of such analysis, the file manager component can determine the group of storage locations in the data store that can be available to write data associated with the file and the extent list data relating to the group of storage locations and data layout. The extent list data can comprise the list of extents and/or the mapping of the group of storage locations in the data store. The list of extents and/or the mapping can comprise information (e.g., extent and/or mapping information) such as, for example, device offsets associated with the group of storage locations of the data store, file offsets associated with the file, FSBNs (which also can be referred to as filesystem storage location numbers) associated with the file offsets, storage offsets associated with the group of storage locations, the lengths of the extents, the states of the extents, and/or other metadata, such as described herein.

At 704, the group of storage locations can be preallocated to the data layout, in accordance with the data layout and associated metadata. The file manager component can preallocate the group of storage locations, in accordance with the data layout and associated metadata (e.g., the extent list data, the mapping, the file offsets, the FSBNs, and/or other metadata).

At 706, the data layout and associated extent list data can be communicated to the client device, wherein the extent list data can comprise a list of extents and/or a mapping of the group of storage locations in the data store to which the client device is able to write the data associated with the file, file offsets associated with the file, FSBNs associated with the file offsets, and/or other desired metadata relating to the data layout. For instance, the server can communicate the data layout and associated extent list data to the client device.

The client device can write (e.g., directly write) respective items of data to respective storage locations of the group of storage locations of the data store of the server (e.g., out of band from the server), in accordance with the data layout indicated or represented by the metadata. At some point after the client device has written the respective items of data to the respective storage locations of the group of the data store of the server, the client device (or associated user) can desire (e.g., want or need) to have the data layout committed to the data store of the server, such as described herein.

At 708, a commit request, comprising metadata, that can request a commit of the data layout can be received from the client device, wherein the metadata can comprise the extent list data, mapping, file offsets, FSBNs, and/or other metadata relating to the data layout. The server can receive the commit request and the metadata (e.g., as part of or in connection with the commit request) from the client device. The commit request can request that the server commit the data layout to the data store of the server. At this point, the method 700 can proceed to reference point A, wherein the method 700 can continue from reference point A, as indicated in FIG. 8.

In some instances, there may be a disruption (e.g., interruption or crash) of operation or service of the server before the server can perform the commit operation to commit the data layout to the data store, or, where the server was able to commit the data layout prior to the server disruption, before the server can communicate a notification message to the client device to notify the client device that the data layout was successfully committed to the data store of the server.

Proceeding from reference point A, at 710, subsequent to disruption of operation of the server, and resolving of the disruption of the operation of the server, a reclaim request, comprising the metadata, that can request a commit of the data layout can be received from the client device, wherein the metadata can comprise the extent list data, mapping, file offsets, FSBNs, and/or other metadata relating to the data layout. The server can receive the reclaim request and the metadata (e.g., as part of or in connection with the commit request) from the client device, for example, during a reclaim period that can take place after the server disruption has been resolved. The reclaim request can request that the server commit the data layout to the data store of the server. The reclaim request can be utilized, for example, to facilitate recovering from a lost data layout commit operation due to the server disruption.

At 712, a state of the metadata relating to the data layout can be reconstructed based at least in part on results of analyzing the received metadata relating to the data layout and/or performing exact block preference-based block allocation. For instance, the file manager component can reconstruct the state of the metadata relating to the data layout based at least in part on the results of analyzing the received metadata relating to the data layout and/or performing the exact block preference-based block allocation (which also can be referred to as exact storage location preference-based storage location allocation). In some embodiments, the file manager component (e.g., employing the allocator component or other component of the file manager component) can determine that exact block preference-based block allocation is to be performed when it determines that one or more blocks associated with (e.g., corresponding to) the metadata (e.g., FSBNs, file offsets, and/or other metadata), which relates to the data layout and was received with the reclaim request, are not allocated or the received metadata (e.g., FSBN) does not match (e.g., if there is a different FSBN at the file offset than the FSBN of the received metadata), such as described herein. The exact block preference-based block allocation can involve the file manager component informing the filesystem that, with regard to the particular (e.g., exact) FSBNs of the received metadata, for each FSBN of those particular FSBNs, the file manager component desires to allocate this particular FSBN for this particular file offset (e.g., the file offset associated with that FSBN), or number of storage locations (e.g., blocks) depending in part on the storage location size and the file offset that the file manager component is tracking, wherein the respective FSBNs can be associated with or correspond to the respective storage locations of the group of storage locations that originally had been preallocated prior to the server disruption. The file manager component can reconstruct or recreate the state of the metadata relating to the data layout, and recreate the data layout, based at least in part on the results of performing this exact block preference-based block allocation.

At 714, a determination can be made regarding whether the metadata relating to the data layout already has been committed to the data store based at least in part on the reconstructed state of the metadata relating to the data layout and an examination of stored metadata that is stored in the data store. That is, the file manager component can determine whether the metadata relating to the storage locations of the group of storage locations already has been committed to the data store. The file manager component can examine (e.g., check, evaluate, or analyze) the stored metadata that is stored in the data store in relation to the reconstructed state of the metadata relating to the data layout to determine whether the metadata relating to the data layout already has been committed to the data store.

At 716, in response to determining that the metadata relating to the data layout already has been committed to the data store, a determination can be made that the reclaim request can be discarded or ignored. If the file manager component determines that the metadata relating to the data layout already has been committed to the data store based at least in part on the examination results, the file manager component can determine that the reclaim request can be discarded or ignored. For instance, if the results of the examination of the stored metadata in relation to the reconstructed state of the metadata indicates that the stored metadata and reconstructed state of the metadata satisfy a defined match criterion (e.g., the stored metadata, including the stored FSBNs, and reconstructed state of the metadata, including the reconstructed FSBNs, match each other), the file manager component can determine that the metadata relating to the data layout already has been committed to and stored in the data store. Accordingly, committing of the reconstructed metadata relating to the data layout can be unnecessary, as the metadata relating to the data layout already is stored in the data store. As a result, the file manager component can determine that the reclaim request can be discarded or ignored.

At 718, a notification message can be communicated to the client device, wherein the notification message can indicate or notify that the data layout (e.g., the metadata relating to or representative of the data layout) has been successfully committed to the data store. The server can communicate the notification message to the client device to notify the client device that the data layout has been successfully committed to the data store.

Referring again to reference numeral 714, if, instead, at 714, it is determined that the metadata relating to the data layout has not been committed to the data store, at 720, a data layout commit operation can be performed to commit the data layout (e.g., the reconstructed metadata relating to or representative of the data layout) to the data store. If, instead, the file manager component determines that the metadata relating to the data layout has not been committed to the data store based at least in part on the examination results, the file manager component can determine that a data commit operation can be performed to commit the data layout to the data store, and can perform the data commit operation to commit the data layout to the data store. For instance, if the results of the examination of the stored metadata in relation to the reconstructed state of the metadata indicates that the stored metadata and reconstructed state of the metadata do not satisfy the defined match criterion (e.g., the reconstructed state of the metadata, including the reconstructed FSBNs, do not match stored metadata in the data store), the file manager component can determine that the metadata relating to the data layout has not yet been committed to and stored in the data store. Accordingly, the file manager component can determine that, in connection with the reclaim request, the data commit operation can be performed to commit the reconstructed metadata relating to the data layout to the data store. After such data layout commit is performed, the metadata (e.g., reconstructed metadata) relating to the data layout can be persistent on the data store.

At this point, the method 700 can proceed to reference numeral 718, where a notification message, which can indicate or notify that the data layout (e.g., the reconstructed metadata relating to or representative of the data layout) has been successfully committed to the data store, can be communicated to the client device. For instance, the server can communicate such notification message to the client device to notify the client device that the data layout has been successfully committed to the data store.

Figure 9:
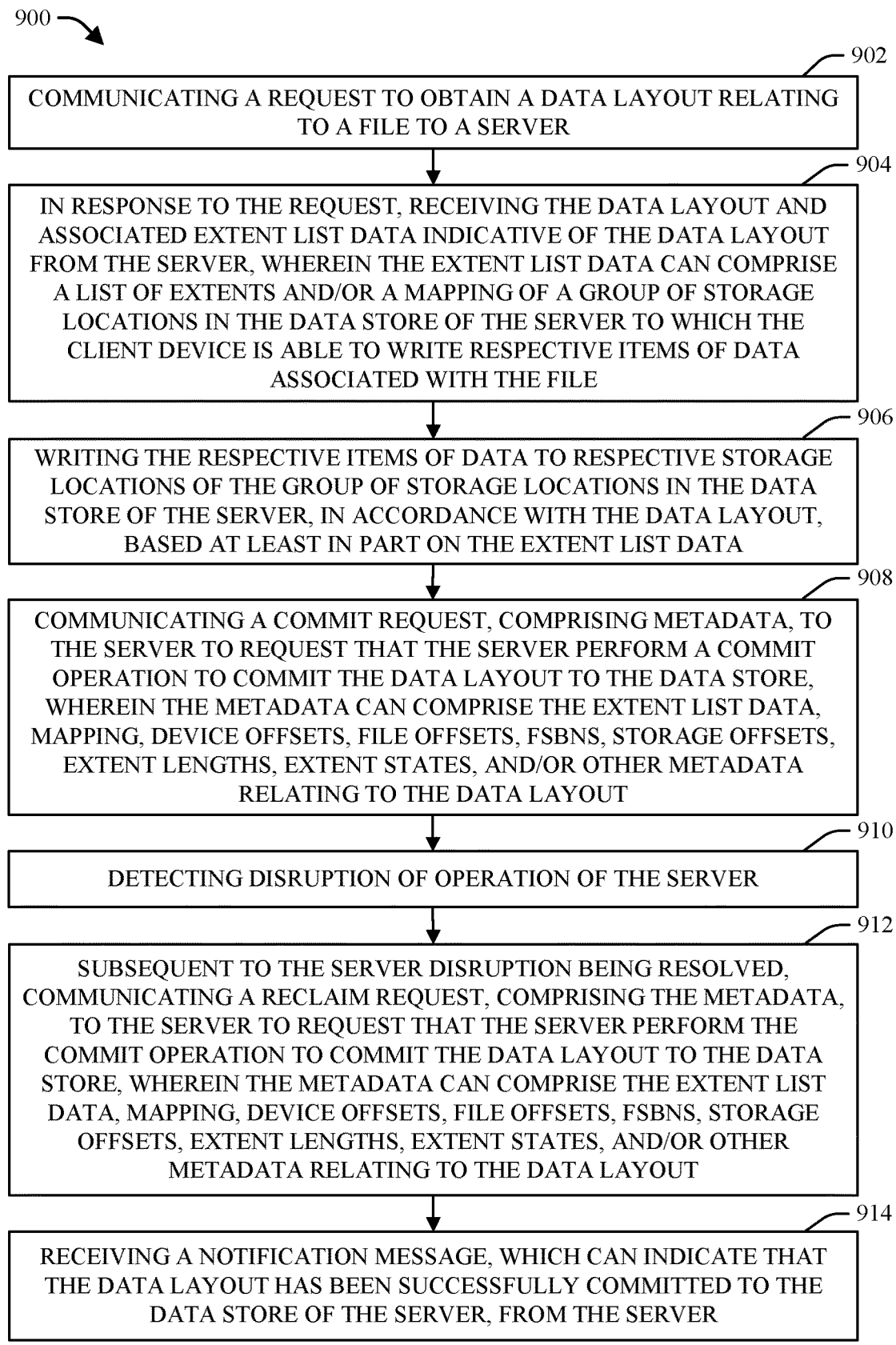
FIG. 9 illustrates a flow chart of an example method 900 that can desirably facilitate performing and managing client data layout retention across server disruption, in connection with commits of data layouts associated with files of client devices to a data store of the server, in accordance with various aspects and embodiments of the disclosed subject matter.

FIG. 9 illustrates a flow chart of an example method 900 that can desirably (e.g., efficiently, suitably, enhancedly, or optimally) facilitate performing and managing client data layout retention across server disruption, in connection with commits of data layouts associated with files of client devices to a data store of the server, in accordance with various aspects and embodiments of the disclosed subject matter. The method 900 can be employed by, for example, a system comprising the server, the device (e.g., client device), the write component, the write manager component, a processor component (e.g., of or associated with the write component and the write manager component), and/or data store (e.g., of or associated with the write component, the write manager component, and/or the processor component).

At 902, a request to obtain a data layout relating to a file can be communicated to a server. For instance, a client device can communicate the request to obtain the data layout relating to the file to the server to facilitate writing data associated with the file to a data store of the server.

At 904, in response to the request, the data layout and associated extent list data indicative of the data layout can be received from the server, wherein the extent list data can comprise a list of extents and/or a mapping of a group of storage locations in the data store of the server to which the client device is able to write respective items of data associated with the file. For instance, in response to the request, the client device can receive the data layout and associated extent list data from the server. The list of extents and/or the mapping can comprise information such as, for example, device offsets associated with the group of storage locations of the data store, file offsets associated with the file, FSBNs (also referred to as filesystem storage location numbers) associated with the file offsets, storage offsets associated with the group of storage locations, the lengths of the extents, the states of the extents, and/or other metadata, such as described herein.

At 906, the respective items of data can be written to respective storage locations of the group of storage locations in the data store of the server, in accordance with the data layout, based at least in part on the extent list data. For instance, the client device can write the respective items of data to the respective storage locations in the data store of the server, in accordance with the data layout, based at least in part on the extent list data. The respective items of data stored in the respective storage locations can be persistent on the data store.

At 908, a commit request, comprising metadata, can be communicated to the server to request that the server perform a commit operation to commit the data layout to the data store, wherein the metadata can comprise the extent list data, mapping, device offsets, file offsets, FSBNs, storage offsets, extent lengths, extent states, and/or other metadata relating to the data layout. For instance, the client device can communicate, to the server, the commit request and the metadata (e.g., as part of or in connection with the commit request). The mapping can indicate the respective storage locations in the data store to which the write component has written the respective items of data.

In some instances, there may be a disruption (e.g., interruption or crash) of operation or service of the server before the server can perform the commit operation to commit the data layout to the data store, or, where the server was able to commit the data layout prior to the server disruption, before the server can communicate a notification message to the client device to notify the client device that the data layout was successfully committed to the data store of the server.

At 910, disruption of operation of the server can be detected. The client device, employing the write manager component, can detect the disruption of the operation of the server, such as described herein.

At 912, subsequent to the server disruption being resolved, a reclaim request, comprising the metadata, can be communicated to the server to request that the server perform the commit operation to commit the data layout to the data store, wherein the metadata can comprise the extent list data, mapping, device offsets, file offsets, FSBNs, storage offsets, extent lengths, extent states, and/or other metadata relating to the data layout. For instance, subsequent to the server disruption being resolved, and during a reclaim period, the client device can communicate, to the server, the reclaim request and the metadata (e.g., as part of or in connection with the commit request), wherein the metadata can comprise the extent list data, mapping, device offsets, file offsets, FSBNs, storage offsets, extent lengths, extent states, and/or other metadata relating to the data layout.

In response to the reclaim request, the server, employing the file manager component, can recreate the data layout and determine whether or not the data layout already had been committed to the data store of the server prior to the server disruption, based at least in part on the metadata, such as described herein. If the file manager component determines that the data layout has not been committed to the data store, the file manager component can commit the data layout (e.g., the recreated data layout) to the data store of the server, such as described herein. If, instead, the file manager component determines that the data layout already was committed to the data store of the server in response to the commit request (e.g., but the server did not send the notification message regarding the successful data layout commit to the client device prior to the server disruption, the file manager component can determine that the reclaim request can be discarded and/or ignored, and the file manager component can communicate a notification message regarding the successful data layout commit to the client device.

At 914, a notification message, which can indicate that the data layout has been successfully committed to the data store of the server, can be received from the server. The client device can receive the notification message from the server. In some embodiments, in response to receiving notification that the data layout (e.g., the metadata or reconstructed metadata relating to or representative of the data layout) has been successfully committed to the data store of the server, the client device (e.g., the write manager component of the client device) can discard the metadata relating to the data layout.

Figure 10:
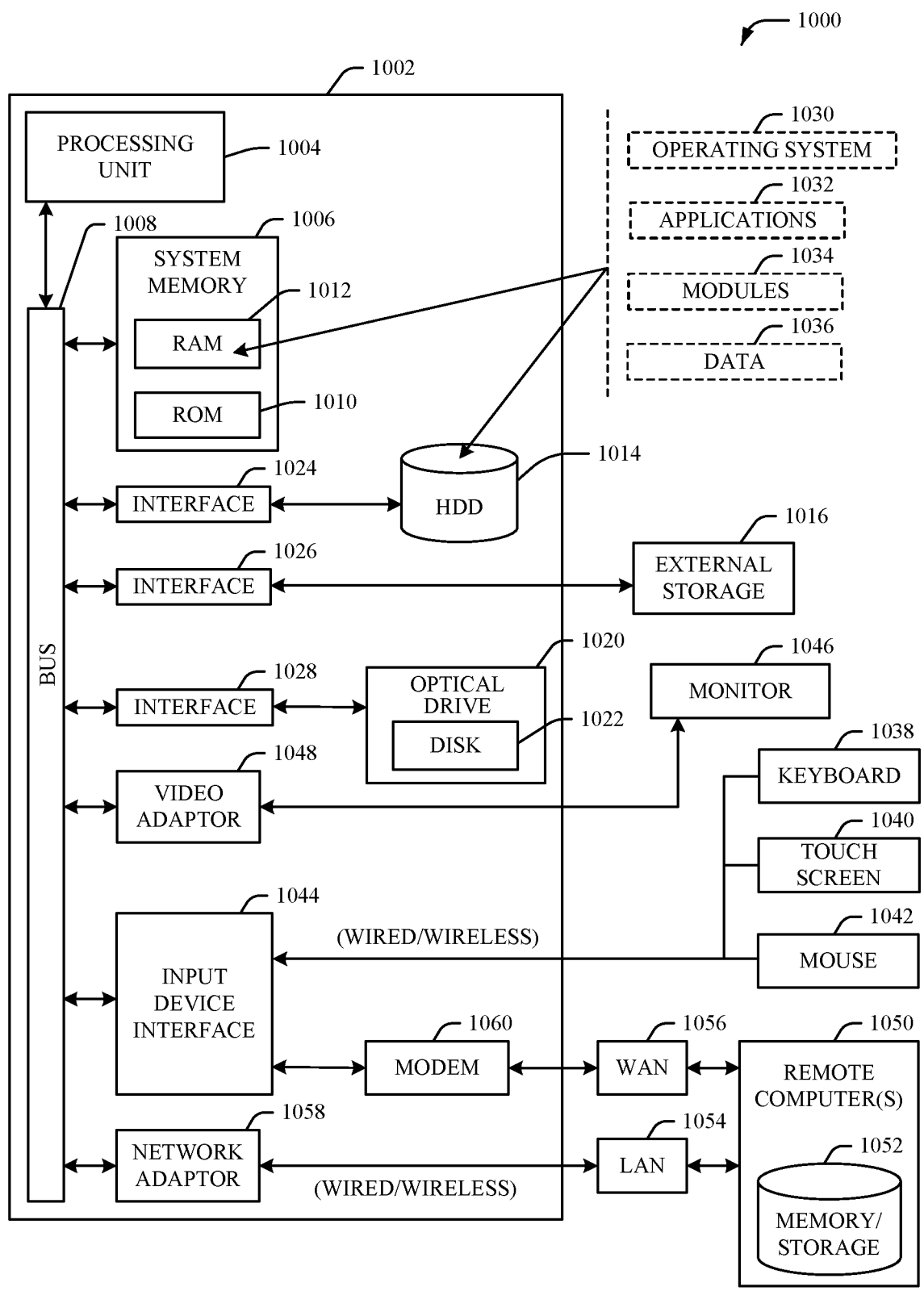
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, server, node, communication network, service, file manager component, write manager component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   in response to a request to obtain a data layout associated with a file from a client device, communicating, by a system comprising a processor, extent list information to the client device, wherein the extent list information comprises a mapping of a group of blocks in a data store of a server to which the client device is able to write data associated with the file, a file offset associated with the file, and a filesystem block number associated with the file offset; and
   subsequent to the client device writing the data to the group of blocks in the data store based on the extent list information, and in response to a disruption of service of the server that occurs before committing of the data layout to the data store or before communicating, to the client device, a notification of a successful committing of the data layout to the data store, recreating, by the system, the data layout based on metadata relating to the data layout and received from the client device, wherein the metadata comprises the file offset and the filesystem block number, and wherein the metadata is received from the client device after the disruption is resolved.

2. The method of claim 1, further comprising:
   in response to a request to obtain the data layout received from the client device, preallocating, by the system, the group of blocks based on the extent list information.

3. The method of claim 2, further comprising:
   determining, by the system, available blocks in the data store to which the data is able to be written based on an analysis of blocks of the data store;
   determining, by the system, a device offset associated with the group of blocks, a data storage offset associated with the group of blocks, the file offset associated with the file, the filesystem block number associated with the file offset, a state of an extent associated with the extent list information, or a length of the extent based on the request and the available blocks, wherein the group of blocks comprises a portion of the available blocks; and
   generating, by the system, the extent list information comprising the mapping based on the available blocks, the device offset, the data storage offset, the file offset, the filesystem block number, or the length of the extent.

4. The method of claim 2, further comprising:
   subsequent to the disruption of the service of the server being resolved, receiving, by the system, a reclaim data layout request from the client device, wherein the reclaim data layout request comprises the metadata; and
   reconstructing, by the system, a state of the metadata by performing exact block preference-based block allocation based on the metadata received from the client device, wherein the group of blocks associated with the metadata is allocated based on the performing of the exact block preference-based block allocation, and wherein the recreating of the data layout comprises recreating the data layout based on the reconstructing of the state of the metadata.

5. The method of claim 4, further comprising:
   in response to the reconstructing of the state of the metadata and the allocating of the group of blocks, committing, by the system, the metadata to the data store based on the recreating of the data layout.

6. The method of claim 4, wherein the data layout further comprising:
   subsequent to the client device writing the data to the group of blocks in the data store based on the extent list information, receiving, by the system, a commit request from the client device, wherein the commit request requests that the data layout be committed to the data store;
   in response to the commit request, committing, by the system, the data layout to the data store, wherein the disruption of the service of the server occurs before the communicating, to the client device, of the notification of the successful committing of the data layout;
   subsequent to the disruption being resolved, and in response to the reclaim request, determining, by the system, that the data layout already was successfully committed to the data store prior to the disruption, based on the reconstructing of the state of the metadata and the performing of the exact block preference-based block allocation; and
   determining, by the system, that the reclaim request can be discarded or ignored based on the determining that the data layout already was successfully committed to the data store.

7. The method of claim 4, further comprising:
   dividing, by the system, a group of logical blocks of a logical address space associated with the data store into respective subgroups of logical blocks, wherein the group of blocks in the data store correspond to some logical blocks of the respective subgroups of logical blocks; and maintaining, by the system, respective allocation statuses of the respective subgroups of logical blocks in respective bitmaps.

8. The method of claim 7, further comprising:

in response to the reclaim data layout request, determining, by the system, filesystem block numbers, comprising the filesystem block number, associated with the file offsets, comprising the file offset, based on the metadata;

examining, by the system, some of the respective bitmaps that relate to the filesystem block numbers;

based on the examining, determining, by the system, whether the group of blocks is already allocated; and one of:
  determining, by the system, that the reclaim request can be discarded or ignored based on determining that the group of blocks is already allocated, or
  determining, by the system, that the reclaim request is to be processed based on determining that the group of blocks is not already allocated.

9. The method of claim 1, wherein, subsequent to the client device writing the data to the group of blocks in the data store, and prior to receiving a commit request to commit the data layout associated with the group of blocks, the data is persistently stored in the group of blocks in the data store and the data layout is not persistently stored in the data store, and wherein, subsequent to successfully committing the data layout to the data store, the data layout is persistently stored in the data store.

10. The method of claim 1, further comprising:

maintaining, by the system, an in-memory state of a filesystem block mapping of a filesystem corresponding to file offsets, comprising the file offset, associated with files, comprising the file, and associated with the data store.

11. A client device, comprising:

a memory that stores computer executable components; and a processor that executes computer executable components stored in the memory, wherein the computer executable components comprise:
  a write component that writes respective items of data to respective storage locations in a data store of a server based on extent list data relating to a data layout and comprising a mapping of a group of storage locations in the data store of the server, respective file offsets associated with the file, and respective filesystem storage location numbers associated with the respective file offsets; and
  a write manager component that communicates a reclaim request, comprising metadata relating to the data layout, to the server to facilitate recreation of the data layout in response to an interruption of service by the server that potentially disrupted or prevented a commit of the data layout to the data store of the server, wherein the metadata comprises information relating to the data layout, the information comprising the respective file offsets and the respective filesystem storage location numbers.

12. The client device of claim 11, wherein the write component writes the respective items of data directly to the respective storage locations in the data store of the server out of band from the server.

13. The client device of claim 11, wherein the write manager component maintains the extent list data, comprising the mapping, the respective file offsets, and the respective filesystem storage location numbers, in a device data store of the client device at least until a commit of the data layout to the data store of the server is successfully performed.

14. The client device of claim 11, wherein the write manager component determines respective device offsets associated with the group of storage locations, respective data storage offsets associated with the group of storage locations, the respective file offsets associated with the file, the respective filesystem storage location numbers associated with the respective file offsets, respective states of respective extents associated with the extent list data, or respective lengths of the respective extents based on the analysis of the extent list data.

15. The client device of claim 11, wherein, subsequent to writing the respective items of data to the respective storage locations in the data store of the server, the write manager component communicates a layout commit request, comprising the metadata relating to the data layout, to the server, wherein the layout commit request requests that the data layout be committed to the data store, and wherein the metadata facilitates the committing of the data layout to the data store.

16. The client device of claim 15, wherein the write manager component detects that there is the interruption of the service by the server that potentially disrupted or prevented the committing of the data layout to the data store of the server, and wherein, in response to detection of the interruption of the service by the server, the write manager component communicates the reclaim request, comprising the metadata relating to the data layout, to the server.

17. The client device of claim 11, wherein the write manager component receives a notification message that indicates the data layout has been successfully committed to the data store of the server.

18. A non-transitory machine-readable medium, comprising executable instructions that, when executed by a processor, facilitate performance of operations, comprising:

in response to a request to obtain a data layout associated with a file from a device, communicating extent list data to the device, wherein the extent list data comprises a mapping of a group of storage locations in a data store of a server to which the device is able to write data associated with the file, respective file offsets associated with the file, and respective filesystem storage location numbers associated with the respective file offsets; and after the device has written the data to the group of storage locations in the data store in accordance with the extent list data, and in response to a disruption of service of the server that occurs before committing of the data layout to the data store or before communicating, to the device, a notification of a successful committing of the data layout to the data store, recreating the data layout based on metadata relating to the data layout and received from the device, wherein the metadata comprises the respective file offsets and the respective filesystem storage location numbers, and wherein the metadata is received from the device after the disruption is resolved.

19. The non-transitory machine-readable medium of claim 18, wherein the operations further comprise:
in response to a request to obtain the data layout received from the device, preallocating the group of storage locations based on the extent list data.

20. The non-transitory machine-readable medium of claim 19, wherein the operations further comprise:
after the disruption of the service of the server is determined to be resolved, receiving a reclaim data layout request from the device, wherein the reclaim data layout request comprises the metadata; and
reconstructing a state of the metadata by performing exact storage location preference-based storage location allocation based on the metadata received from the device, wherein the group of storage locations associated with the metadata is allocated based on the performing of the exact storage location preference-based storage location allocation, and wherein the recreating of the data layout comprises recreating the data layout based on the reconstructing of the state of the metadata.

* * * * *